(12) United States Patent
Malewicz et al.

(10) Patent No.: US 9,886,325 B2
(45) Date of Patent: *Feb. 6, 2018

(54) SYSTEM AND METHOD FOR LIMITING THE IMPACT OF STRAGGLERS IN LARGE-SCALE PARALLEL DATA PROCESSING

(71) Applicant: Google LLC, Mountain View, CA (US)

(72) Inventors: Grzegorz Malewicz, Mountain View, CA (US); Marian Dvorsky, Sunnyvale, CA (US); Christopher B. Colohan, Palo Alto, CA (US); Derek P. Thomson, Palo Alto, CA (US); Joshua Louis Levenberg, Menlo Park, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/213,188

(22) Filed: Jul. 18, 2016

(65) Prior Publication Data

US 2017/0090993 A1 Mar. 30, 2017

Related U.S. Application Data

(63) Continuation of application No. 14/727,753, filed on Jun. 1, 2015, now Pat. No. 9,396,036, which is a
(Continued)

(51) Int. Cl.
*G06F 9/44* (2006.01)
*G06F 9/50* (2006.01)

(52) U.S. Cl.
CPC .................. *G06F 9/5077* (2013.01)

(58) Field of Classification Search
None
See application file for complete search history.

(56) References Cited

U.S. PATENT DOCUMENTS 3,905,023 A 9/1975 Perpiglia
5,850,547 A 12/1998 Waddington et al.
(Continued)

OTHER PUBLICATIONS

Dean et al.; MapReduce: Simplified Data Processing on Large Clusters; Jan. 2008; Communications of the ACM.*
(Continued)

*Primary Examiner* — Corey S Faherty
(74) *Attorney, Agent, or Firm* — Morgan, Lewis & Bockius LLP

(57) ABSTRACT

A large-scale data processing system and method including a plurality of processes, wherein a master process assigns input data blocks to respective map processes and partitions of intermediate data are assigned to respective reduce processes. In each of the plurality of map processes an application-independent map program retrieves a sequence of input data blocks assigned thereto by the master process and applies an application-specific map function to each input data block in the sequence to produce the intermediate data and stores the intermediate data in high speed memory of the interconnected processors. Each of the plurality of reduce processes receives a respective partition of the intermediate data from the high speed memory of the interconnected processors while the map processes continue to process input data blocks an application-specific reduce function is applied to the respective partition of the intermediate data to produce output values.

20 Claims, 16 Drawing Sheets

Related U.S. Application Data continuation of application No. 13/965,108, filed on Aug. 12, 2013, now Pat. No. 9,047,141, which is a continuation of application No. 12/759,637, filed on Apr. 13, 2010, now Pat. No. 8,510,538.

(60) Provisional application No. 61/168,916, filed on Apr. 13, 2009.

(56) References Cited

U.S. PATENT DOCUMENTS

| | | |
|---|---|---|
| 5,854,938 A | 12/1998 | Ogi |
| 5,872,904 A | 2/1999 | McMillen et al. |
| 5,872,981 A | 2/1999 | Waddington et al. |
| 5,878,408 A | 3/1999 | Van Huben et al. |
| 5,937,201 A | 8/1999 | Matsushita et al. |
| 6,029,174 A | 2/2000 | Sprenger et al. |
| 6,041,384 A | 3/2000 | Waddington et al. |
| 6,088,511 A | 7/2000 | Hardwick |
| 6,169,989 B1 | 1/2001 | Eichstaedt et al. |
| 6,182,061 B1 | 1/2001 | Matsuzawa et al. |
| 6,185,555 B1 | 2/2001 | Sprenger et al. |
| 6,192,359 B1 | 2/2001 | Tsuchida et al. |
| 6,223,176 B1 | 4/2001 | Richard et al. |
| 6,292,822 B1 | 9/2001 | Hardwick |
| 6,321,373 B1 | 11/2001 | Ekanadham et al. |
| 6,351,749 B1 | 2/2002 | Brown et al. |
| 6,453,360 B1 | 9/2002 | Muller et al. |
| 6,493,797 B1 | 12/2002 | Lee et al. |
| 6,622,301 B1 | 9/2003 | Hirooka et al. |
| 6,874,010 B1 | 3/2005 | Sargent |
| 7,093,004 B2 | 8/2006 | Bernardin et al. |
| 7,146,365 B2 | 12/2006 | Allen et al. |
| 7,174,381 B2 | 2/2007 | Gulko et al. |
| 7,356,762 B2 | 4/2008 | van Driel |
| 7,386,849 B2 | 6/2008 | Dageville et al. |
| 7,392,320 B2 | 6/2008 | Bookman et al. |
| 7,650,331 B1 | 1/2010 | Dean et al. |
| 7,756,919 B1 | 7/2010 | Dean et al. |
| 7,917,574 B2 | 3/2011 | Liu |
| 8,255,905 B2 | 8/2012 | Sudzilouski et al. |
| 8,510,538 B1 | 8/2013 | Malewicz et al. |
| 8,612,510 B2 | 12/2013 | Dean et al. |
| 2002/0095260 A1 | 7/2002 | Huyn |
| 2002/0099716 A1 | 7/2002 | Thompson |
| 2002/0196799 A1 | 12/2002 | Remer et al. |
| 2003/0115439 A1 | 6/2003 | Mahalingam et al. |
| 2003/0120708 A1 | 6/2003 | Pulsipher et al. |
| 2003/0120709 A1 | 6/2003 | Pulsipher et al. |
| 2003/0177240 A1 | 9/2003 | Gulko et al. |
| 2003/0195931 A1 | 10/2003 | Dauger |
| 2003/0204703 A1 | 10/2003 | Rajagopal et al. |
| 2003/0233370 A1 | 12/2003 | Barabas et al. |
| 2004/0139193 A1 | 7/2004 | Refai et al. |
| 2004/0148273 A1 | 7/2004 | Allen et al. |
| 2004/0205057 A1 | 10/2004 | Hutchison et al. |
| 2004/0226013 A1 | 11/2004 | Mariotti et al. |
| 2004/0236761 A1 | 11/2004 | Both |
| 2004/0267807 A1 | 12/2004 | Barabas et al. |
| 2005/0044067 A1 | 2/2005 | Jameson |
| 2005/0228802 A1 | 10/2005 | Kezuka et al. |
| 2005/0234985 A1 | 10/2005 | Gordon et al. |
| 2006/0259246 A1 | 11/2006 | Huyn |
| 2007/0038659 A1* | 2/2007 | Datar .................. G06Q 30/02 |
| 2008/0005525 A1 | 1/2008 | Rosenbluth et al. |
| 2008/0270436 A1 | 10/2008 | Fineberg et al. |
| 2009/0089544 A1 | 4/2009 | Liu |
| 2009/0313635 A1 | 12/2009 | Dasdan |
| 2009/0327668 A1 | 12/2009 | Sudzilouski et al. |
| 2011/0208947 A1 | 8/2011 | Lin et al. |
| 2012/0166448 A1 | 6/2012 | Li et al. |

OTHER PUBLICATIONS

Dean et al.; MapReduce: Simplified Data Processing on Large Clusters; 2004; OSDI.*

Barroso, Web search for a planet: the Google cluster architecture, Apr. 2003, 7 pgs.

Ghemawat, The Google file system, 2003, 15 pgs.

Petrini, System-Level Fault-Tolerance in Large-Scale Parallel Machines with Buffered Coscheduling, IPDPS'04, 2004, 8 pgs.

Robin, Efficient dispersal of information for security, load balancing and fault tolerance, Apr. 1989, 14 pgs.

Riedel, Active disk for large-scale data processing, Jun. 2001, 7 pgs.

Thain, Distributed computing in practice: the condor experience, 2004, 34 pgs.

Valiant, A bridging model for parallel computation, Aug. 1999, 9 pgs.

* cited by examiner

Library (Application-specific) 422

Map Functions 424

| Map Function 1 (Default) | 450-A |
| Map Function 2 (including user-defined parameters) | 450-B |
| Map Function 3 (user-defined) | 450-C |
| Map Function 4 (predefined) | 450-D |
| ⋮ | |

Combiner Functions 425

| Combiner Function 1 (Default) | 452-A |
| Combiner Function 2 (including user-defined parameters) | 452-B |
| Combiner Function 3 (user-defined) | 452-C |
| Combiner Function 4 (predefined) | 452-D |
| ⋮ | |

Reduce Functions 426

| Reduce Function 1 (Default) | 454-A |
| Reduce Function 2 (including user-defined parameters) | 454-B |
| Reduce Function 3 (user-defined) | 454-C |
| Reduce Function 4 (predefined) | 454-D |
| ⋮ | |

Partition Functions 428

| Partition Function 1 (Default) | 456-A |
| Partition Function 2 (including user-defined parameters) | 456-B |
| Partition Function 3 (user-defined) | 456-C |
| Partition Function 4 (predefined) | 456-D |
| ⋮ | |

*Figure 4B*

Task Status Table

| Task ID | Status | Process | Input Files | Output Files | ... |
|---|---|---|---|---|---|
| Map0000 | Completed | P0000 | 12340 | 12341 | ... |
| Map0001 | Completed | P0001 | 12344 | 12345 | ... |
| ⋮ | ⋮ | | | | |
| Map0103 | In Progress | P0010 | 12030 | 12031 | ... |
| Map0104 | Failed | P0011 | 10101 | 12102 | ... |
| Map0103b | In Progress | P0010 | 12030 | 12031 | ... |
| ⋮ | ⋮ | | | | |
| Red0000 | In Progress | P0033 | 12340, ... | 14000 | ... |
| Red0001 | Waiting | - | - | - | ... |

*Figure 7A*

Process Status Table

| Process ID | Status | Location | Current | ... |
|---|---|---|---|---|
| P0000 | Busy | CPU001 | Task Map0000 | ... |
| P0001 | Busy | CPU011 | Task Map0001 | ... |
| ⋮ | ⋮ | | | |
| P0033 | Busy | CPU015 | Task Red0000 | ... |
| P0034 | Idle | CPU016 | None | ... |
| P0034 | Failed | CPU016 | None | ... |
| ⋮ | ⋮ | | | |
| P0100 | Busy | CPU031 | WQMaster | ... |

*Figure 7B*

SYSTEM AND METHOD FOR LIMITING THE IMPACT OF STRAGGLERS IN LARGE-SCALE PARALLEL DATA PROCESSING

RELATED APPLICATIONS

This application is a continuation of U.S. application Ser. No. 14/727,753, filed Jun. 1, 2015, now U.S. Pat. No. 9,396,036, which is a continuation of U.S. application Ser. No. 13/965,108, filed Aug. 12, 2013, now U.S. Pat. No. 9,047,141, which is a continuation of U.S. application Ser. No. 12/759,637, filed Apr. 13, 2010, now U.S. Pat. No. 8,510,538, which claims priority to U.S. Provisional Application No. 61/168,916, filed Apr. 13, 2009, which are hereby incorporated by reference in their entireties.

This application is related to U.S. patent application Ser. No. 10/871,245, "Large Scale Data Processing in a Distributed and Parallel Processing Environment," filed Jun. 18, 2004, and U.S. patent application Ser. No. 10/871,244, "System and Method for Efficient Large-Scale Data Processing," filed Jun. 18, 2004, which are hereby incorporated by reference in their entireties.

TECHNICAL FIELD

The disclosed embodiments relate generally to data processing systems and methods, and in particular to a framework for simplifying large-scale data processing.

BACKGROUND

Large-scale data processing involves extracting data of interest from raw data in one or more datasets and processing it into a useful data product. The implementation of large-scale data processing in a parallel and distributed processing environment typically includes the distribution of data and computations among data storage devices (e.g., low speed memory and high speed memory, where the data seeking time on high speed memory is much faster than the data seeking time on low speed memory) and processors to make efficient use of aggregate data storage space and computing power.

Large-scale data processing techniques such as a map-reduce operation (sometimes called a large-scale data processing operation) have proven to be a remarkably flexible system for parallelizing computation on clusters. A system and method for efficiently performing such computations are becoming increasingly important as the size of the data sets and the size of the computer clusters used to perform the computations grow. One of the hardest performance challenges is to limiting the impact of (e.g., minimize the delay caused by) stragglers in parallel computation. In one embodiment, reduce stragglers are reduce processes that are running after a substantial portion of the total number of reduce processes have finished running (e.g., the last 10% of reduce processes that are running).

Various functional languages (e.g., LISP™) and systems provide application programmers with tools for querying and manipulating large datasets. These conventional languages and systems, however, fail to provide support for automatically parallelizing these operations across multiple processors in a distributed and parallel processing environment. Nor do these languages and systems automatically handle system faults (e.g., processor failures) and I/O scheduling. In addition these conventional large-scale data processing techniques are often adversely affected by stragglers. The disclosed system and method eliminates or reduces the impact of such stragglers on large scale data processing computations.

SUMMARY

A system and method for executing a plurality of processes on a plurality of interconnected processors, the plurality of processes including a master process for coordinating a data processing job for processing a set of input data, and plurality of map processes and a plurality of reduce processes. In the master process, assigning input data blocks of a set of input data to respective map processes of the plurality of map processes and assigning partitions of intermediate data to respective reduce processes of the plurality of reduce processes. In each of the plurality of map processes: executing an application-independent map program to retrieve a sequence of input data blocks assigned thereto by the master process and to apply an application-specific map function to each input data block in the sequence to produce the intermediate data; and storing the intermediate data in high speed memory of the interconnected processors. In each of the plurality of reduce processes: receiving a respective partition of the intermediate data from the high speed memory of the interconnected processors while the map processes that produced the received intermediate data continue to process input data blocks; and applying an application-specific reduce function to the respective partition of the intermediate data to produce output values.

In accordance with a first aspect of the system and method, identifying a first reduce process that is delaying the data processing job and, in response, reassigning at least one of the multiple partitions, which has not yet been processed, to a second reduce process, including copying the intermediate data in the reassigned partition to the other reduce process.

In accordance with a second aspect of the system and method, identifying a first reduce process that is delaying the data processing job and, in response, dividing the intermediate data in a partition that is assigned to the first reduce process into a plurality of subpartitions and assigning each subpartition to a reduce process that is not the first reduce process.

BRIEF DESCRIPTION OF THE DRAWINGS

FIG. 4B is a block diagram of a library of application-specific functions, in accordance with some embodiments.

FIG. 7A is a block diagram of an exemplary task status table, in accordance with some embodiments.

FIG. 7B is a block diagram of an exemplary process status table, in accordance with some embodiments.

DESCRIPTION OF EMBODIMENTS

Large-Scale Data Processing Model

Figure 1:
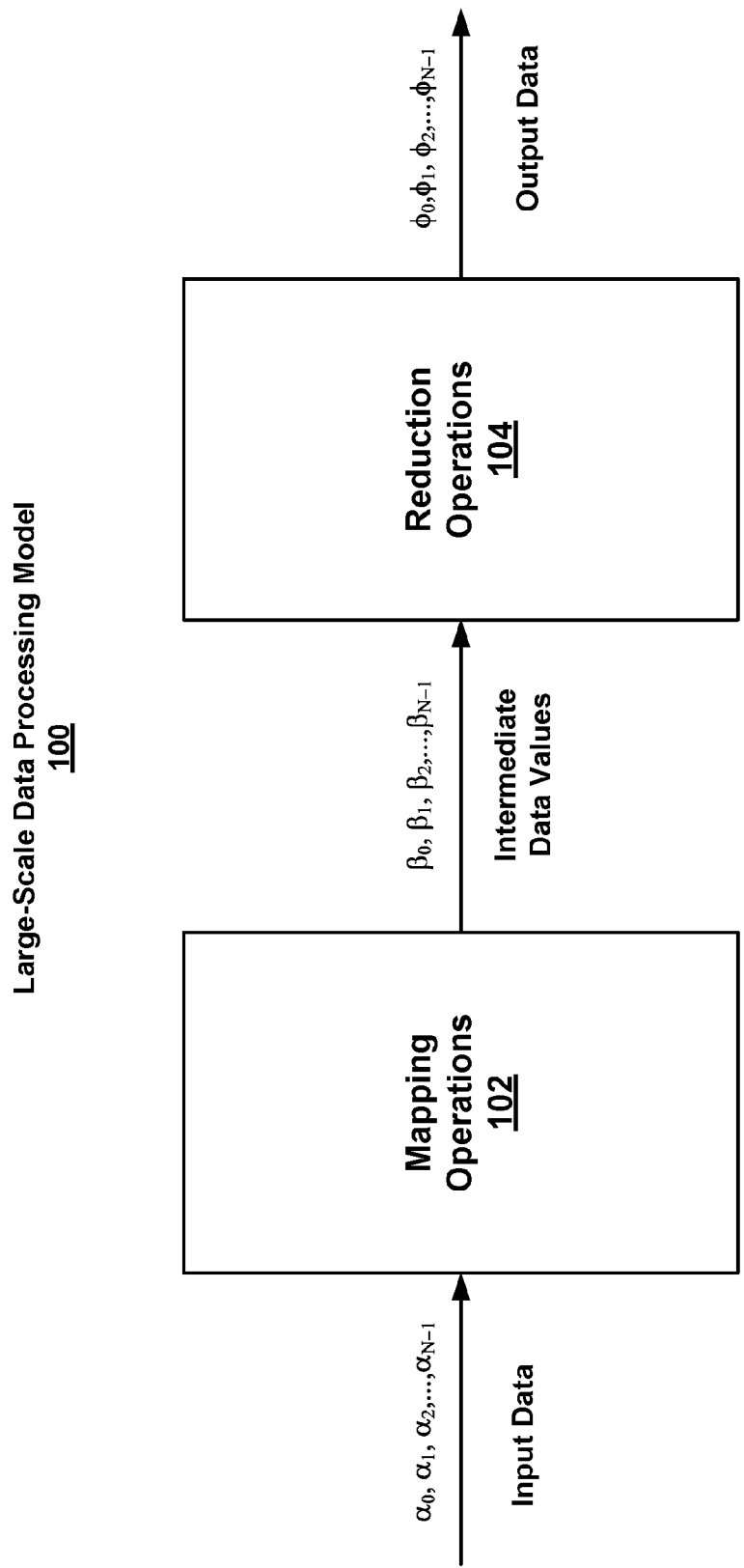
FIG. 1 is a block diagram of a large-scale data processing model, in accordance with some embodiments.

FIG. 1 is a block diagram of a large-scale data processing model 100. The model 100 generally includes mapping operations 102 and reduction operations 104. The mapping operations 102 apply one or more mapping functions to a set of input data $\alpha_i$ (e.g., text files, records, logs, sorted maps, tables, record I/O, etc.) to provide a set of intermediate data values $\beta_i$. The reduction operations 104 apply one or more reduction functions to the set of intermediate data values $\beta_i$ to provide a set of output data $\varphi_i$ (e.g., text files, records, logs, sorted maps, tables, record I/O, etc.). In some embodiments, the mapping operations 102 are implemented as one or more application-specific map functions, which receive a set of input data $\alpha_i$ and provide a set of intermediate data values $\beta_i$. The intermediate data values $\beta_i$ are stored in one or more intermediate data structures (e.g., low speed memory or high speed memory where the high speed memory takes less time to respond to a data seek request than the low speed memory). Some examples of intermediate data structures include, without limitation, files, buffers, histograms, count tables and any other suitable data structure or device for storing information (e.g., digital information). The intermediate data values $\beta_i$ are processed by the reduction operations 104, which are implemented as one or more application-specific reduction functions, which receive the set of intermediate data values $\beta_i$ and provide a set of output data φi.

Distributed Data Processing System

In order to explain the operation of the large scale data processing system, it is helpful to consider an exemplary distributed data processing system in which the large scale data processing is performed. In general, the embodiments described here can be performed by a set of interconnected processors that are interconnected by one or more communication networks.

Figure 5:
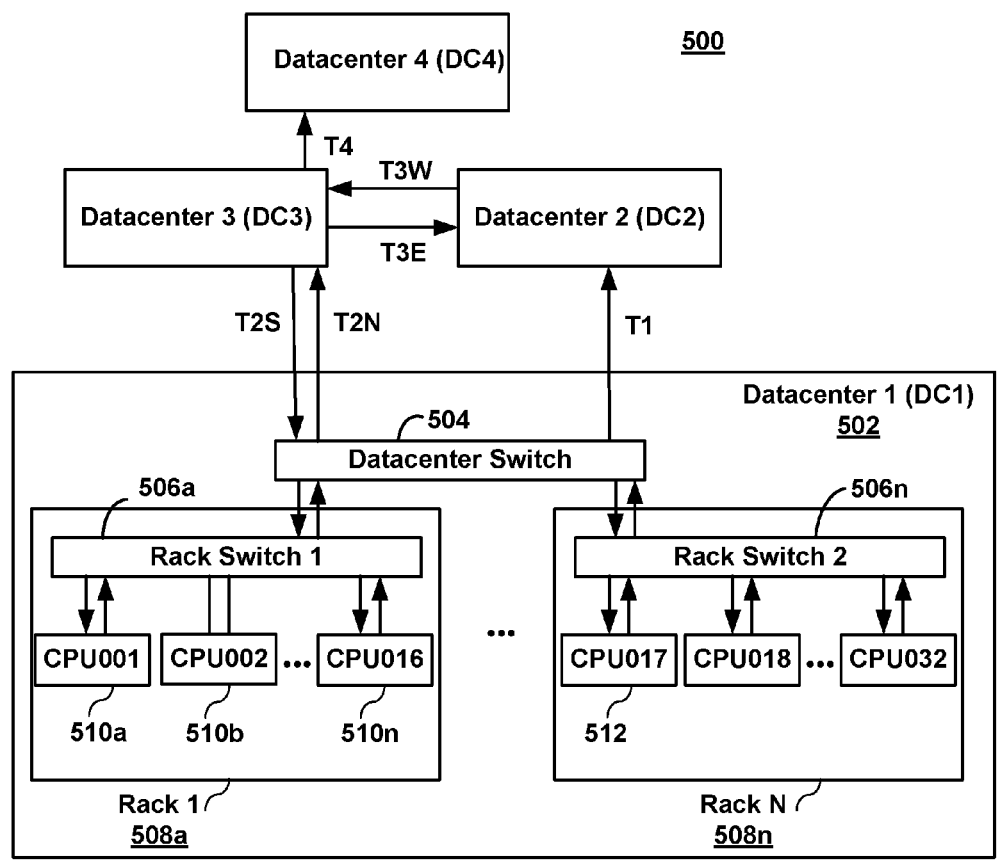
FIG. 5 is a block diagram of a data distribution network for large-scale data processing, in accordance with some embodiments.

FIG. 5 is a block diagram of an exemplary distributed data processing system 500. It should be appreciated that the layout of the system 500 is merely exemplary and the system 500 may take on any other suitable layout or configuration. The system 500 is used to store data, perform computational tasks, and transmit data between datacenters DC1-DC4. The system may include any number of data centers DCx, and thus the number of data centers shown in FIG. 5 is only exemplary. The system 500 may include dedicated optical links or other dedicated communication channels, as well as supporting hardware such as modems, bridges, routers, switches, wireless antennas and towers, and the like. In some embodiments, the network 500 includes one or more wide area networks (WANs) as well as multiple local area networks (LANs). In some embodiments, the system 500 utilizes a private network, i.e., the system and its interconnections are designed and operated exclusively for a particular company or customer. Alternatively, a public network may be used.

Some of the datacenters DC1-DC4 may be located geographically close to each other, and others may be located far from the other datacenters. In some embodiments, each datacenter includes multiple racks. For example, datacenter 502 (DC1) includes multiple racks 508a, . . . , 508n. The racks 508 can include frames or cabinets into which components are mounted. Each rack can include one or more processors (CPUs) 510. For example, the rack 508a includes CPUs 510a, . . . , 510n (slaves 1-16) and the nth rack 506n includes multiple CPUs 510 (CPUs 17-31). The processors 510 can include data processors, network attached storage devices, and other computer controlled devices. In some embodiments, at least one of processors 510 operates as a master processor, and controls the scheduling and data distribution tasks performed throughout the network 500. In some embodiments, one or more processors 510 may take on one or more roles, such as a master and/or slave. A rack can include storage (e.g., one or more network attached disks) that is shared by the one or more processors 510.

In some embodiments, the processors 510 within each rack 508 are interconnected to one another through a rack switch 506. Furthermore, all racks 508 within each datacenter 502 are also interconnected via a datacenter switch 504. As noted above, the present invention can be implemented using other arrangements of multiple interconnected processors.

Further details regarding the distributed network 500 of FIG. 5 can be found in U.S. patent application Ser. No. 10/613,626, entitled "System and Method For Data Distribution," filed Jul. 3, 2003, which application is incorporated by reference herein in its entirety.

In another embodiment, the processors shown in FIG. 5 are replaced by a single large-scale multiprocessor. In this embodiment, map and reduce functions are automatically assigned to processes running on the processors of the large-scale multiprocessor.

Large-Scale Data Processing System I

Figure 2:
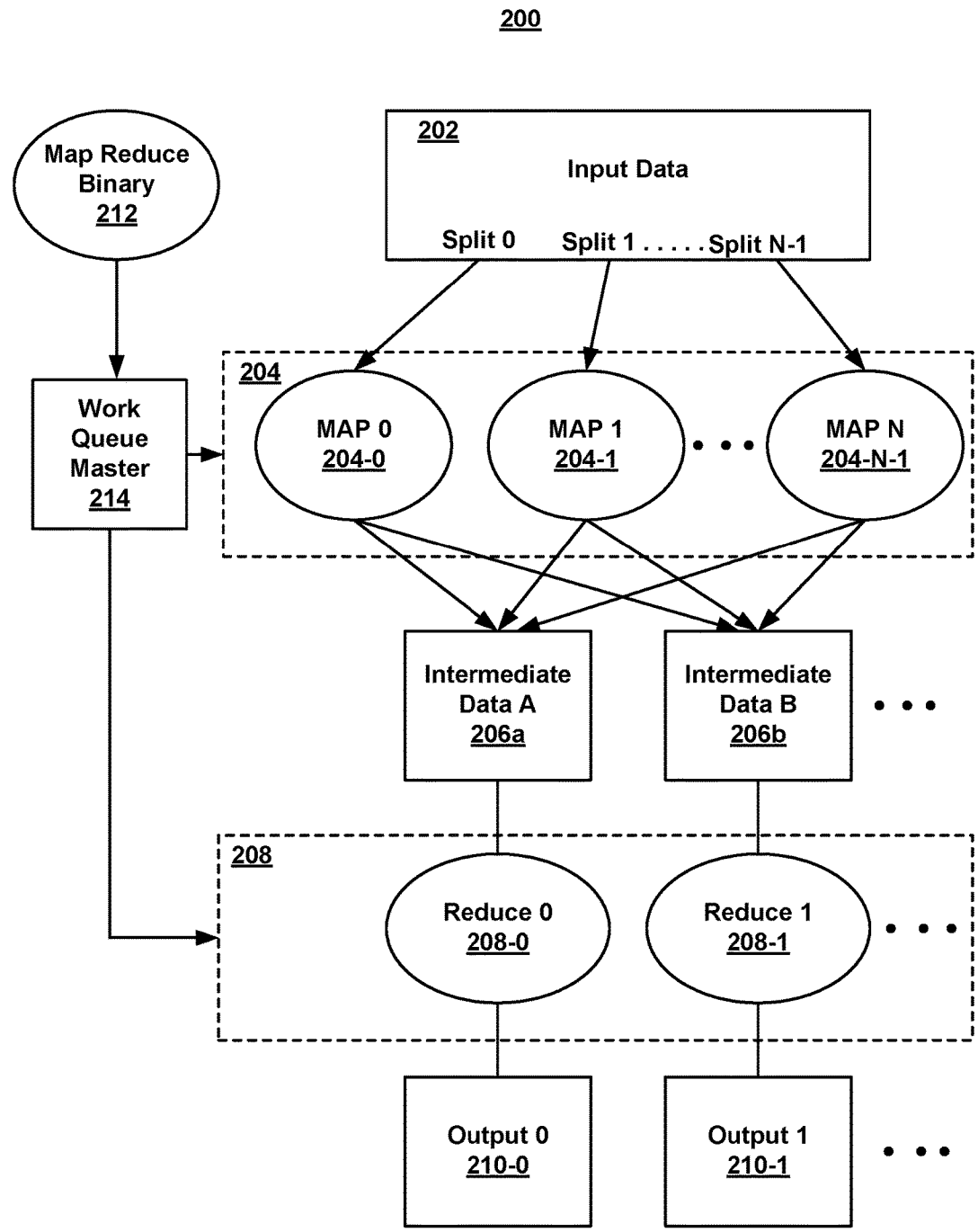
FIG. 2 is a block diagram of a large-scale data processing system, in accordance with some embodiments.

FIG. 2 is a block diagram of a large-scale data processing system 200. The system 200 provides application programmers with an application-independent framework for writing data processing software that can run in parallel across multiple different machines on a distributed network. The system 200 is typically a distributed system having multiple processors, possibly including network attached storage nodes, that are interconnected by one or more communication networks. FIG. 2 provides a logical view of a system 200, which in some embodiments may be implemented on a system having the physical structure shown in FIG. 5. In one embodiment, the system 200 operates within a single data center of the system 500 shown in FIG. 5, while in another embodiment, the system 200 operates over two or more data centers of the system 500.

As shown in FIG. 2, a set of input data (e.g., files) 202 are processed by a first set of processes 204, herein called map processes, to produce a set of intermediate data (e.g., files) 206. The intermediate data 206 is processed by a second set of processes 208, herein called reduce processes, to produce output data 210. Generally each "map process" is a process configured (or configurable) to perform map operations by and executing an application-specific map function. Each "reduce process" is a process configured (or configurable) to perform reduce operations and by executing an application-specific reduce function. A control or supervisory process, herein called the work queue master 214, controls the set of processing tasks. As described in more detail below, the work queue master 214 determines how many map tasks to use, how many reduce tasks to use, which processes and processors to use to perform those tasks, where to store the intermediate data and output data, how to respond to any processing failures, and so on.

It should be noted that the work queue master 214 assigns tasks to processes, and that multiple processes may be executed by each of the processors in the group of processors that are available to do the work assigned by the work queue master 214. In the context of FIG. 5 or any other multiple processor system, the set of processes controlled by the work queue master 214 may be a subset of the full set of processes executed by the system, and furthermore the set of processors available to do the work assigned by the work queue master 214 may be fewer than the full set of processors in the system. Some of the resources of the system may be used for other tasks, such as tasks that generate the input data 202, or that utilize the output data 210. However, in some embodiments, some or all of the tasks that generate the input data 202 or utilize the output data 210 may also be controlled or supervised by the work queue master 214. In addition, in some embodiments processors can be added or removed from the processing system during the execution of a map-reduce operation (sometimes called a large-scale data processing operation). The work queue master 214 keeps track of the processors in the system and the available processes executing on those processors.

Application programmers are provided with a restricted set of application-independent programs (e.g., map programs, partition programs, reduce programs) for reading input data and generating output data. The programs contain procedures for automatically handling data partitioning, parallelization of computations, fault tolerance (e.g., recovering from process and machine failures) and I/O scheduling. In some embodiments, to perform a specific data processing operation on a set of input data (e.g., files), the only information that must be provided by an application programmer is: information identifying the input file(s) to be processed, information identifying or specifying the output data (e.g., files) to receive output data, and two application-specific data processing functions, hereinafter referred to as map( ) and reduce( ). Generally, the map( ) function specifies how input data is to be processed to produce intermediate data and the reduce( ) function specifies how the intermediate data values are to be merged or otherwise combined. Note that the disclosed embodiments are not limited to any particular type or number of functions. Other types of functions (e.g., data filters) can be provided, as needed, depending upon the system 200 architecture and the data processing operations required to produce the desired, application-specific results. In some embodiments, the application programmers provide a partition function, in addition to the map( ) and reduce( ) functions. The partition( ) function, specifies how the intermediate data is to be partitioned when the intermediate data is provided to the reduce processes.

To perform large-scale data processing, a user-specified (also called requestor-specified) set of input data (e.g., files) 202 are split into multiple data blocks 0, ..., N−1 of either a specified or predefined size (e.g., 64 MB). Alternately, in some embodiments the input data (e.g., files) 202 have a predefined maximum size (e.g., 1 GB), and the individual data files are the data blocks. A data block is a subset of data that is retrieved during processing. In some embodiments, the data blocks are distributed across multiple storage devices (e.g., magnetic or optical disks) in a data distribution network to fully utilize the aggregate storage space and disk bandwidth of the data processing system.

Referring to FIGS. 2 and 5, in some embodiments the input data (e.g., files) 202 are stored in one or more data centers DC1-DC4. Ideally, the work queue master 214 assigns tasks to processors 510 in datacenters where the input data (e.g., files) are stored so as to minimize network traffic whenever possible. In some embodiments, the work queue master 214 uses input file information received from a file system to determine the appropriate processor or process for executing a task, using a hierarchical decision process. When a process in a processor in a datacenter DC1-DC4 is idle, it requests a task from the work queue master 214. The work queue master 214 searches the input file information received from the file system (e.g., FS 446, FIG. 4A), for an unprocessed data block on the machine assigned to process the task. If none are available, the work queue master 214 searches the file information for an unprocessed data block on the same rack 508 as the machine assigned to process the task. If none are available, the work queue master 214 searches the file information for an unprocessed data block in the same datacenter as the machine assigned to process the task. If none are available, the work queue master 214 will search for unprocessed blocks in other datacenters.

By using a hierarchical assignment scheme, data blocks can be processed quickly without requiring large volumes of data transfer traffic on the network 500. This in turn allows more tasks to be performed without straining the limits of the network 500.

Task Management

Referring again to FIG. 2, application programmers develop the map( ) and/or reduce( ) functions, which are computer programs that process input data and intermediate, respectively. In some embodiments these functions are compiled into binary files 212 suitable for use on a particular processing platform. The binary files 212 are loaded into a work queue master module 214, which manages jobs submitted by users of the system 200. In some embodiments, the work queue master 214 loads (or causes to be loaded) onto each process to which it allocates a map or reduce task, the parallelization procedures, and the map( ) or reduce( ) function required to perform the task assigned to the process.

The work queue master 214, when it receives a request to process a set of data using a specified set application-specific map( ), reduce( ) and, optionally, partition( ) functions, determines the number of map tasks and reduce tasks to be performed to process the input data. This may be based on the amount of input data to be processed. For example, a job may include 10,000 map tasks and 10 reduce tasks. In some embodiments, the work queue master module generates a task status table having entries representing all the tasks to be performed, and then begins assigning those tasks to idle processes. As noted above, tasks may be allocated to idle processes based on a resource allocation scheme (e.g., priority, round-robin, weighted round-robin, etc.).

Process and Task Status Tracking

Figure 6:
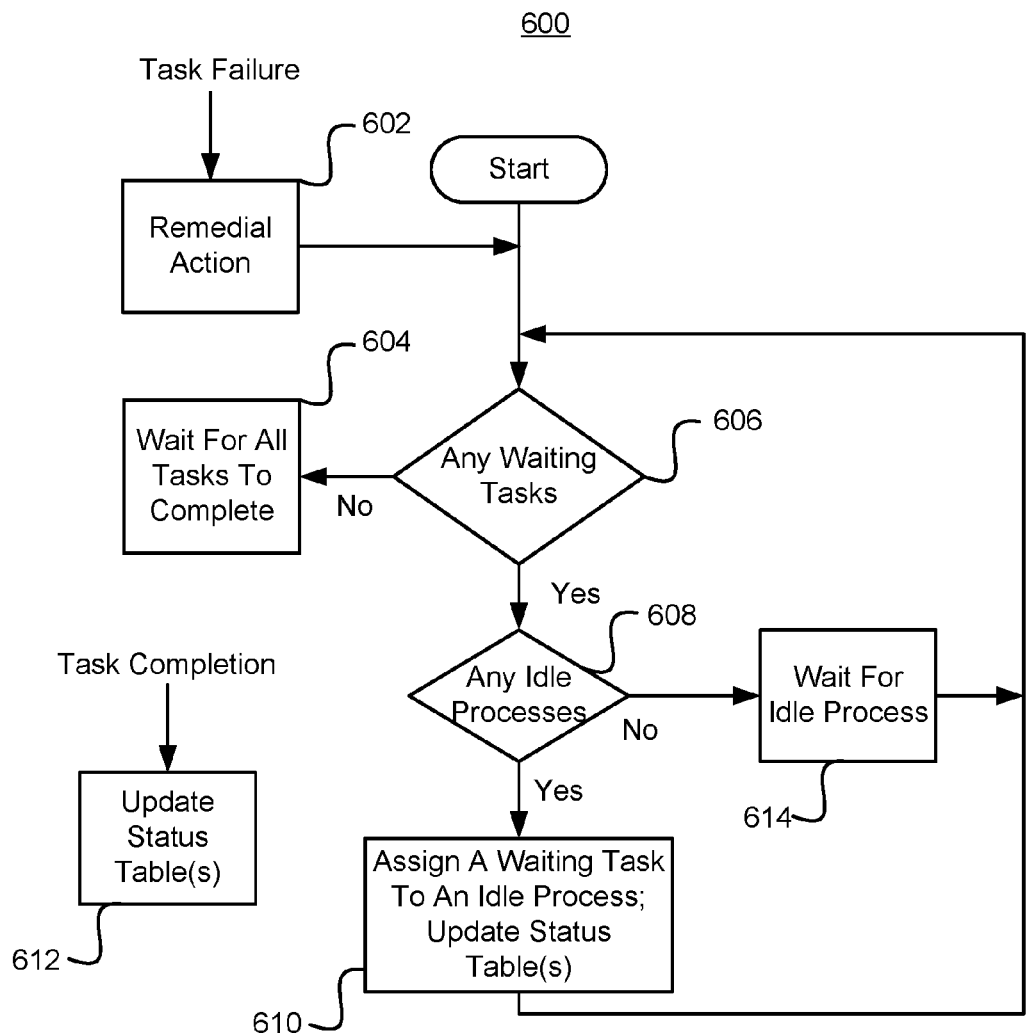
FIG. 6 is a flow diagram of an embodiment of a process for assigning tasks to processes, in accordance with some embodiments.

FIG. 6 is a flow diagram of an embodiment of a process 600 for assigning tasks to processes. Process 600 parallelizes a data processing task over as many processes as is consistent with the available computing resources. While the process 600 described below includes a number of steps that appear to occur in a specific order, it should be apparent that the process 600 steps are not limited to any particular order, and, moreover, the process 600 can include more or fewer steps, which can be executed serially or in parallel (e.g., using parallel processors or a multi-threading environment). Further, it should be noted that the steps or acts in process 600 are application-independent and are implemented using modules or instructions that are application-independent. Only the actual map functions and reduce functions that produce intermediate data values from the input data and that produce output data from the intermediate data values, respectively, are application-specific. These application-specific functions are invoked by the map and reduce tasks assigned to processes in step 610. By making a clear boundary between the application-independent aspects and application-specific aspects of performing a large scale data processing operation, the application-independent aspects can be optimized, thereby making the entire large scale data processing operation very efficient.

The process 600 begins by determining if there are tasks waiting to be assigned to a process (step 606). If there are no tasks waiting, then the process 600 waits for all the tasks to complete (step 604). If there are tasks waiting, then the process 600 determines if there are any idle processes (step 608). If there are idle processes, then the process 600 assigns a waiting task to an idle process (step 610) and returns to step 606. If there are no idle processes, the process 600 waits for an idle process (step 614). Whenever a process completes a task, the process sends a corresponding message to the work queue master 214, which updates the process and task status tables (step 612). The work queue master 214 may then assign a new task to the idle process, if it has any unassigned tasks waiting for processing resources. For reduce tasks, the work queue master 214 may defer assigning any particular reduce task to an idle process until such time that the intermediate data to be processed by the reduce task has, in fact, been generated by the map tasks. Some reduce tasks may be started long before the last of the map tasks are started if the intermediate data to be processed by those reduce tasks is ready for reduce processing.

In some embodiments, whenever a process fails, which may be discovered by the work queue master 214 using any of a number of known techniques, the work queue master 214 (A) determines what task was running in the failed process, if any, (B) assigns that task to a new process, waiting if necessary until an idle process becomes available, and (C) updates its process and task status tables accordingly. In some embodiments, the work queue master 214 may undertake remedial measures (step 602), such as causing the failed process to be restarted or replaced by a new process. In some embodiments, the work queue master may further detect when such remedial measures fail and then update its process status table to indicate such failures. In addition, in some embodiments, when a map task fails and is restarted in a new process, all processes executing reduce tasks are notified of the re-execution so that any reduce task that has not already read the data produced by the failed process will read the data produced by the new process.

FIG. 7A shows an exemplary task status table for keeping track of the status of map and reduce tasks. In some embodiments, each task (e.g., map, reduce) is assigned task ID, a status, a process, and one or more input data (e.g., files) and output data (e.g., files). In some embodiments, the input data (e.g., files) field may specify a portion of an input file (e.g., where the portion comprises a data block) to be processed by the task, or this field may specify portions of input data (e.g., two of more input files). The status field indicates the current status of the task (e.g., waiting, in-progress, completed, or failed), which is being performed by the assigned process identified in the process field. The process retrieves data from one or more input files (or the one or more input file portions) identified in the input file field and writes the results of the task ID to one or more output files identified in the output file field. For example, in FIG. 7A, task Red0000 is assigned to process P0033, which is still in progress. The process P0033 retrieves data blocks from input file 12340 (e.g., intermediate file A, FIG. 2) and writes the results of the task to output file 14000. In some embodiments, until a task is assigned to a process, the process field in the task status table indicates that no process has yet been assigned to perform that task. It should be apparent that there could be more or fewer fields in the task status table than shown in FIG. 7A, such as multiple fields for identifying output data (e.g., files) and input data (e.g., files).

FIG. 7B shows a process status table for keeping track of the status of all the processes to which the work queue master 214 can assign tasks. In some embodiments, each process is assigned to a task and a location. In some embodiments, each process is permanently assigned to a particular location (i.e., a particular processor). The status field indicates the current status of the process, which performs the assigned task at the assigned location. For example, process P0010 is "Busy" performing task Map0103 on location CPU011. It should be apparent that there could be more or fewer field in the process status table than shown in FIG. 7B, such as assigning multiple locations assigned to a single task (e.g., parallel processing).

Map Phase

In some embodiments, the set of application-specific data processing operations that the map( ) function can perform is constrained. For example, in some embodiments, the map( ) function may be required to process the input data one record at a time, proceeding monotonically from the first record to the last record in the data block being processed. In some embodiments, the map( ) function may be required to generate its output data in the form of key-value pairs. Either the key or value or both can comprise structured data, as long as the data can be encoded into a string. For example, the key may have multiple parts, or the value may have multiple parts.

By requiring the map( ) function's output to be in the form of key-value pairs, the resulting intermediate data can be mapped to a set of intermediate data (e.g., files) in accordance with a partition( ) function. An exemplary partition( ) function may specify that all intermediate data is to be directed to an intermediate file corresponding to the value of the first byte of the key. Another exemplary partition( ) function may specify that all intermediate data is to be directed to an intermediate file corresponding to the value of the function "hash(Key) modulo N", where N is a value specified by the application programmer and "hash(Key)" represents the value produced by applying a hash function to the key of the key-value pairs in the intermediate data. In some embodiments, the partition function is always a modulo function and the application programmer only specifies the modulus to be used by the modulo function. In one embodiment, the partition function is automatically selected by the work queue master 214, or by one of the application-independent processes, discussed below.

In some embodiments, the data blocks 0, . . . , N–1 are automatically assigned to map tasks (executed by map processes 204-0, . . . , 204-N–1) in an application-independent manner, by the work queue master 214. In particular, the work queue master 214 is configured to determine the number of data blocks to be processed, and to create a corresponding number of instances of the map process 204. Stated in another way, the work queue master 214 assigns a corresponding number of map tasks to processes, as suitable processes become available. Since the number of map tasks may exceed the number of processes available to the work queue master 214, the work queue master 214 will assign as many map tasks as it can to available processes, and will continue to assign the remaining map tasks to processes as the processes complete previously assigned tasks and become available to take on new tasks. The work queue master 214 uses the task status table and process status table, described above, to coordinate its efforts.

Reduce Phase

Application-independent reduce modules 208 read intermediate data values (e.g., key-value pairs) from the intermediate data 206 and apply an application-specific reduce function to the intermediate data values. In some embodiments, each reduce module 208 reads from only one intermediate file 206. The reduce modules 208 sort the intermediate data values, merge or otherwise combine sorted intermediate data values having the same key and then write the key and combined values to output data (e.g., one or more output files) 210. In some embodiments, the intermediate file 206 and the output data (e.g., files) 210 are stored in a File System (FS), which is accessible to other systems via a distributed network.

Software Implementation

In some embodiments, the map and reduce modules 204 and 208 are implemented as user-defined objects with methods to carry out application-specific processing on data using known object-oriented programming techniques. For example, a MapReduction base class can be created that includes methods and data for counting the number of input data files that contain a particular term or pattern of terms, sorting the results, eliminating duplicates in the sorted results and counting the number of occurrences of the term. Application programmers can derive other classes from the base class and instantiate the base class as an object in the application code to access its data and methods.

Large-Scale Data Processing System II

While the system 200 provides good performance for many large-scale data processing, the performance of the system 200 may diminish as the amount of data to be processed and thus the number of tasks increases. For instance, performance may be diminished when the size of the data blocks is decreased, thereby increasing the number of map tasks. Since the intermediate data 206 are stored in the FS, an increase in tasks results in an increase in intermediate file access requests and an associated increase in network traffic. Additionally, a single work queue master 214 can only handle a limited number of task assignments per time period, beyond which the work queue master 214 begins to limit system performance. Increasing the size of those tasks to accommodate additional jobs could result in load imbalances in the system 200. These performance issues are addressed in the system 300, which is described below with respect to FIG. 3.

Figure 3:
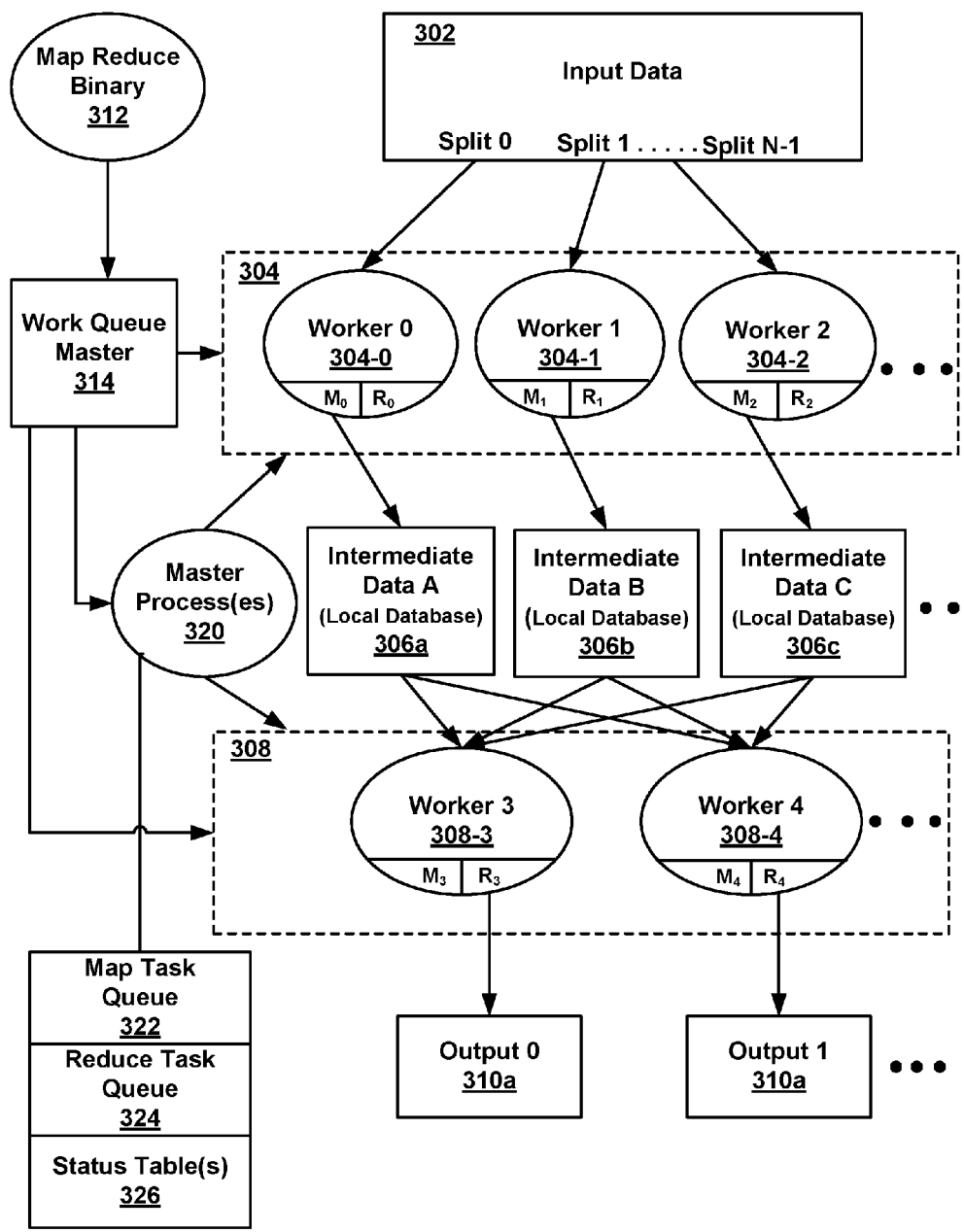
FIG. 3 is a block diagram of a large-scale data processing system, including a master process for managing tasks, in accordance with some embodiments.

FIG. 3 is a block diagram of a large-scale data processing system 300, including a master process 320 (sometimes called a supervisory process) for managing tasks. In system 300, one or more master processes 320 assign one or more tasks to one or more worker processes 304 and 308. In some embodiments, the master process 320 is a task itself (e.g., task 0) initiated by the work queue master module 314 and is responsible for assigning all other tasks (e.g., mapping and reducing tasks) to the worker processes 304, 308, in a master/slave type relationship. The worker processes 304, 308 include two or more process threads, each of which can be invoked based on the particular task assigned to it by the master process 320. For example, each worker process 304 invokes a map thread to handle an assigned map task and invokes a reduce thread to handle an assigned reduce task. In one embodiment, the worker processes 304, 308 include one or more additional threads. For example, a distinct thread may be used to receive remote procedure calls (e.g., from the master process) and to coordinate work done by the other threads. In another example, a distinct thread may be used to handle remote read requests received from other processors (i.e., peers) in the system.

In one embodiment, the number of worker processes is equal to the number of machines available in the system 300 (i.e., one worker process per machine). In another embodiment, two or more worker processes are used in each of the machines in the system 300. If a worker process fails, its task is reassigned to another worker process by the master process 320. In some embodiments, the master process 320 or the work queue master 314 may undertake remedial measures to repair, restart or replace a failed worker process.

In some embodiments, when the work queue master 314 receives a map/reduce data processing job, the work queue master 314 allocates the job to a master process 320. The master process 320 determines the number (M) of map tasks and the number (R) of reduce tasks to be performed, and then makes a request to the work queue master 314 for M+R processes (M+R+1, including the master process 320) to be allocated to the map/reduce data processing job. The work queue master 314 responds by assigning a number of processes to the job, and sends that information to the master process 320, which will then manage the performance of the data processing job. If the number of processes requested exceeds the number of processes available, or otherwise exceeds the number of processes that the work queue master 314 is allowed to assign to the job, the number of processes assigned to the job will be less than the number requested.

In some embodiments, all R of the reduce tasks are all immediately assigned to processes, but the reduce tasks do not begin work (e.g., on data sorting) until the master process 320 informs them that there are intermediate data ready for processing. In some embodiments, a single worker process 304/308 can be assigned both a map task and a reduce task, simultaneously (with each being executed by a distinct process thread), and therefore assigning reduce tasks to processes at the beginning of the job does not reduce the throughput of the system.

Map Phase

The division of the user-specified input data (e.g., files) 302 into data blocks 0, . . . , N–1, may be handled automatically by the application-independent code. Alternately, the user may set an optional flag, or specify a parameter, so as to control the size of the data blocks into which the input data (e.g., files) are divided. Furthermore, the input data may come from sources other than files, such as a database or in-memory data structures.

The input data blocks 0, . . . , N−1, which may in some embodiments be treated as key-value pairs, are read by application-independent worker processes 304-0, . . . , 304-N−1, as shown in FIG. 3. The input data (e.g., files) 302 can include a variety of data types typically used in data processing systems, including without limitation text data (e.g., files), record I/O, sorted data structures (such as B-trees), tables and the like. Each of the worker processes 304 to which a map task has been assigned applies the application-specific map( ) operator to the respective input data block so as generate intermediate data values. The intermediate data values are collected and written to one or more intermediate data 306, which are stored locally at the machine (e.g., in one or more local databases) in which the worker process 304 is executed. The intermediate data 306 are retained (i.e., they are persistent) until the reduce phase completes. Note that in some embodiments, each of the intermediate data 306 receives output from only one worker process 304, as shown in FIG. 3. When a worker process 304 completes its assigned task, it informs the master process 320 of the task status (e.g., complete or error). If the task was successfully completed, the worker process's status report is treated by the master process 320 as a request for another task.

In some embodiments, if there are enough worker processes 304 that all the intermediate values can be held in memory across the worker processes, then the system need not write any data to files on local disks. This optimization reduces execution time for map-reduce operations in which the number of worker processes is sufficient to handle all the map tasks at once, and the amount of intermediate data is sufficiently small to be kept in memory.

Application-Specific Combiner Function

In some cases, there is significant repetition in the intermediate keys produced by each map task, and the application-specific reduce function is both commutative and associative. When all these conditions apply, a special optimization can be used to significantly reduce execution time of the map-reduce task. An example of a situation in which the optimization can be applied is a map-reduce operation for counting the number of occurrences of each distinct word in a large collection of documents. In this example, the application-specific map function outputs a key-value pair for every word w in every document in the collection, where the key-value pair is <w, 1>. The application-specific reduce function for this example is:

```
input data is "values";
int result=0; // initialize result to zero
for each v in values:
    result += ParseInt(v);
output: <key, result>
```

Each map task in this example will produce hundreds or thousands of records of the form <word, 1>. The reduce function simply adds up the count values. To help conserve network bandwidth for map-reduce operations that satisfy these properties, the user may provide an application-specific combiner function. The combiner function is invoked with each unique intermediate key and a partial set of intermediate values for the key. This is similar to the reduce function, except that it gets executed at the end of each map task by the same machine and process that performed by map task. The combiner function partially summarizes the intermediate key-value pairs. In fact, when using a combiner function, the same function is typically specified for the combiner and reduce operations. The partial combining performed by the combiner operation significantly speeds up certain classes of Map-Reduce operations, in part by significantly reducing the amount of information that must be conveyed from the processors that handle map tasks to processors handling reduce tasks, and in part by reducing the complexity and computation time required by the data sorting and reduce function performed by the reduce tasks.

Reduce Phase

Application-independent worker processes 308 which have been assigned reduce tasks read data from the locally stored intermediate data 306. In some embodiments, the master process 320 informs the worker processes 308 where to find intermediate data (e.g., files) 306 and schedules read requests for retrieving intermediate data values from the intermediate data (e.g., files) 306. In some embodiments, each of the worker processes 308 reads a corresponding one of the intermediate data 306 produced by all or a subset of the worker processes 304. For example, consider a system in which each of the worker processes 304 assigned a map task outputs M (e.g., 100) intermediate data, which we will call Partition-1,j through Partition-M,j, where j is an index identifying the map task that produced the intermediate data. The system will have 100 worker processes 308, Worker-1 to Worker-M, each of which reads a corresponding subset of the intermediate data, Partition-p,j for all valid values of "j," produced by the worker processes 304, where "p" indicates the partition assigned to a particular worker process Worker-P (304) and "j" is an index identifying the map tasks that produced the intermediate data.

Each worker process 308 sorts the intermediate data values in the subset of the intermediate data read by that worker process in accordance with the key of the key-value pairs in the intermediate data. The sorting of the key-value pairs is an application-independent operation of the reduce threads in the worker processes 308. Each worker process 308 also merges or otherwise combines the sorted intermediate data values having the same key, and writes the key and combined values as output data (e.g., to one or more output files) 310. The merging or other combining operation performed on the sorted intermediate data is performed by an application-specific reduce( ) operator. In some embodiments, the output data (e.g., files) 310 are stored in a File System, which is accessible to other systems via a distributed network. When a worker process 308 completes its assigned reduce task, it informs the master process 320 of the task status (e.g., complete or error). If the reduce task was completed successfully, the worker process's status report is treated by the master process 320 as a request for another task. If the reduce task failed, the master process 320 reassigns the reduce task to another worker process 308.

Recovering from Task and Processor Failures

In some embodiments, the master process 320 is configured to detect task and processor failures. When a task failure is detected, the master process 320 reassigns the task to another process. In some embodiments, the master process 320 redistributes the work of the failed task over a larger number of tasks so as to complete that task more quickly than by simply re-executing the task on another process. The master process subdivides the work assigned to the failed task to a plurality of newly mini-tasks, and then resumes normal operation by assigning the mini-tasks to available processes. The number of mini-tasks may be a predefined number, such as a number between 8 and 32, or it may be dynamically determined based on the number of idle processes available to the master process. In the case of a failed map task, division of the work assigned to the failed task means assigning smaller data blocks to the mini-tasks. In the case of a failed reduce task, division of the work assigned to the failed task may mean assigning the data sorting portion of the reduce task to a larger number of worker processes, thereby performing a distributed sort and merge. The resulting sorted data may, in some embodiments, be divided into a number of files or partitions, each of which is then processed using the requestor-specified application-specific reduce( ) function to produce output data. By detecting such failures and taking these remedial actions, the amount of delay in completing the entire data processing operation is significantly reduced.

When a processor failure is detected by the master process 320, it may be necessary to re-execute all the tasks that the failed processor completed as well as any tasks that were in process when the processor failed, because the intermediate results produced by map tasks are stored locally, and the failure of the processor will in many cases make those results unavailable. Using the status tables, described above, the master process 320 determines all the tasks that ran on the processor, and also determines which of those tasks need to be re-executed (e.g., because the results of the tasks are unavailable and are still needed). The master process 320 then updates its status tables to indicate that these identified tasks are waiting for assignment to worker tasks. Thereafter, re-execution of the identified tasks is automatically handled using the processes and mechanisms described elsewhere in this document.

In some embodiments, an additional mechanism, herein called backup tasks, is used to guard against task failures as well as task slow downs. One of the main problems that lengthens the total time taken for a map-reduce operation to complete is the occurrence of "straggler" tasks or machines. A straggler is a process or machine that takes an unusually long time to complete one of the last few map or reduce tasks in the computation. Stragglers can arise for many reasons, including both hardware and software errors or conditions. When a large map-reduce operation is divided into thousands of map and reduce tasks executed by thousands of processes, the risk of a straggler task occurring is significant. While, the use of backup tasks, as described next, reduces some of the problems associated with stragglers, additional optimizations are possible. In particular, as described in greater detail below with reference to FIGS. 12A-13B, partition replication, performing reduce-side combination operations and subpartitioning provide additional methods for limiting the impact of stragglers on large-scale data processing.

In these embodiments, the master process determines when the map-reduce operation is close to completion. In one embodiment, the criteria for being close to completion is that the percentage of map tasks that have completed is above a threshold. In another embodiment, the criteria for being close to completion is that the percentage of map and reduce tasks, taken together, that have completed is above a threshold. The threshold can be any reasonable number, such as 95, 98, or 99 percent, or any percentage above 90 percent. Once the master process determines that the map-reduce operation is close to completion, the master process schedules backup executions of all remaining tasks. These duplicate tasks may be called backup map tasks and backup reduce tasks. FIG. 7A shows an exemplary backup task, Map103b, in the task status table. Each task is marked as completed when either the primary or backup execution completes. This mechanism obviously increases the computational resources, and thus in some embodiments the criteria for invoking this mechanism are selected so as to increase the computational resources by no more than a few percent (e.g., five percent). The use of backup tasks significantly reduces the time to complete large data-processing operations, often by more than twenty-five percent.

Master Process & Status Tables

The master process 320 is responsible for assigning tasks to the worker processes 304 and 308 and for tracking their status and output. Periodically, the master process 320 solicits a report from each worker process assigned a task to determine its task status. In some embodiments, the report can be solicited using a polling scheme (e.g., round-robin). If the task status indicates that the worker process has failed, then the task is put back in the appropriate task queue to be reassigned to another worker process. In some embodiments, the master process 320 maintains status tables 326 for managing tasks, as described with respect to FIGS. 7A and 7B.

In one embodiment in which more than one master process 320 is used, a locking mechanism is used to ensure that each of the entries of the status tables is modified by only one of the master processes at any one time. Whenever a master process 320 attempts to assign a map or reduce task to a process, or perform any other management of a map or reduce task, the master process first acquires (or attempts to acquire) a lock on the corresponding status table entry. If the lock is refused, the master process concludes that the map/reduce task is being managed by another master process and therefore the master process looks for another map/reduce task to manage. In another embodiment, the task status table is divided into portions, with each master process being given ownership of a corresponding portion of the task status table, and responsibility for managing the map/reduce tasks in that portion of the task status table. Each master process can read other portions of the task status table, but only uses information in entries indicating that the corresponding task has been completed.

The system 300 provides several advantages over other systems and methods by using one or more master processes to assign and manage tasks, together with local databases to store intermediate results produced by the tasks. For example, by distributing file reads over multiple local databases more machines can be used to complete tasks faster. Moreover, since smaller tasks are spread across many machines, a machine failure will result in less lost work and a reduction in the latency introduced by such failure. For example, the FS load for system 200 is O(M*R) file opens and the FS load for system 300 is O(M) input file opens+ O(R) output file opens, where M is the number of map tasks and R is the number of reduce tasks. Thus, the system 200 requires significantly more file system file open operations than the system 300.

Computer System for Large-Scale Data Processing

Figure 4A:
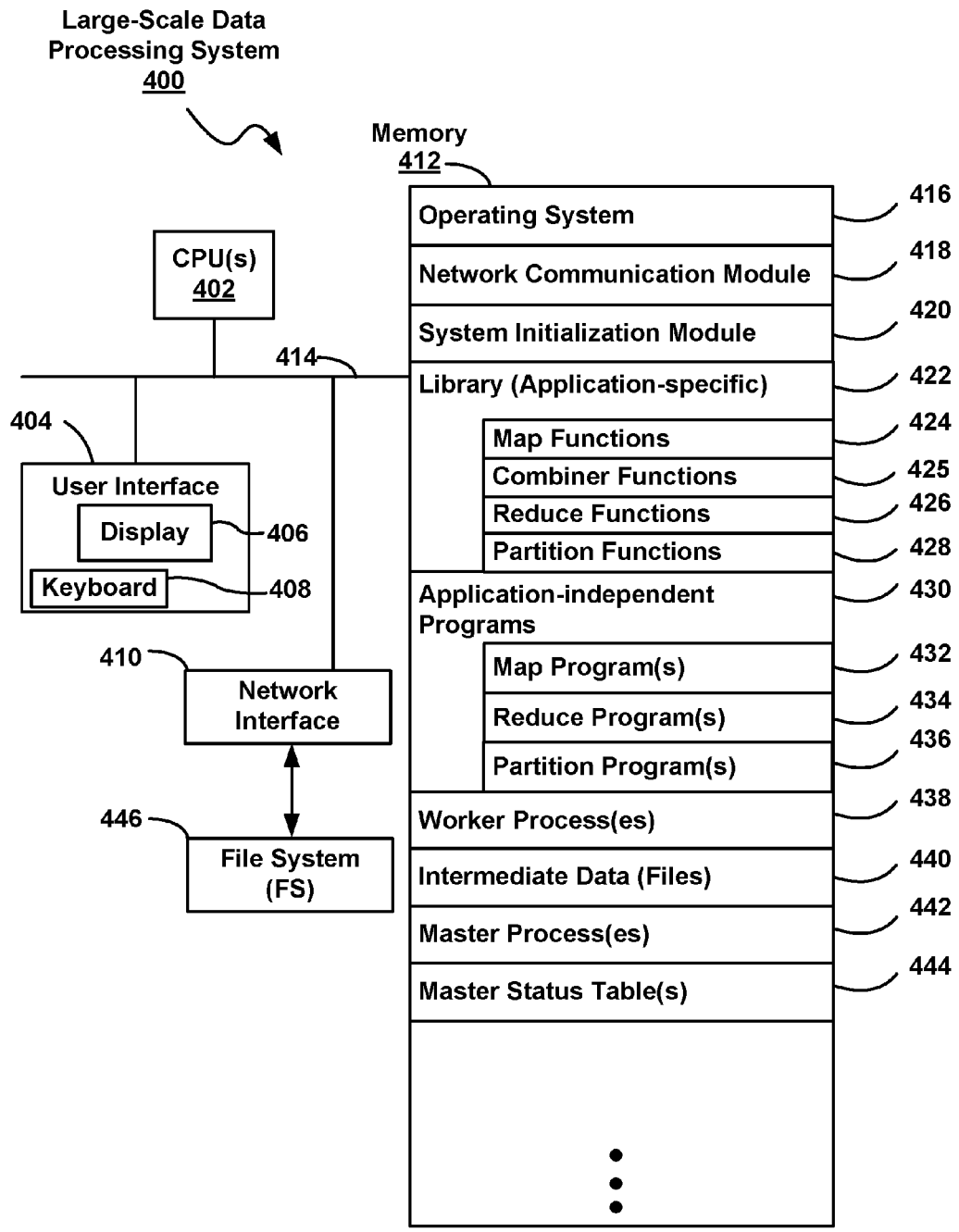
FIG. 4A is a block diagram of a computer system for the data processing systems, in accordance with some embodiments.

FIG. 4A is a computer system 400 for the data processing systems 200 and 300 shown in FIGS. 2 and 3. The computer system 400 generally includes one or more processing units (CPUs) 402, one or more network or other communications interfaces 410, memory 412, and one or more communication buses 414 for interconnecting these components. The system 400 may optionally include a user interface 404, for instance a display 406 and a keyboard 408. Memory 412 may include high speed random access memory and may also include non-volatile memory, such as one or more magnetic disk storage devices. Memory 412 may include mass storage that is remotely located from the central processing unit(s) 402.

The memory 412 stores an operating system 416 (e.g., Linux or Unix), a network communication module 418, a system initialization module 420, a library of application-specific functions 422 and plurality of application-independent programs 430 such as one or more map programs 432, one or more reduce programs 434 and one or more partition programs 436. The operating system 416 generally includes procedures for handling various basic system services and for performing hardware dependent tasks. The network communication module 418 is used for connecting the system 400 to a file system (FS) 446, servers or other computing devices via one or more communication networks, such as the Internet, other wide area networks, local area networks, metropolitan area networks, and the like. The system initialization module 420 initializes other modules and data structures stored in memory 412 required for the appropriate operation of the system 400.

In some embodiments, the library of application-specific functions 422 includes one or more application-specific map functions 424, one or more application-specific reduce functions 426 and one or more application-specific partition functions 428, and the plurality of application-independent programs 430 includes one or more application-independent map programs 432, one or more reduce programs 434, and one or more partition programs 436. As discussed above, the library of application-specific functions 422 may also include one or more application-specific combiner functions 425 when the map-reduce operation meets certain conditions. The programs, procedures or instructions in the plurality of application-independent programs 430 handle the application-independent aspects of large scaled data processing jobs, while the library of application-specific functions 422 provide the application-specific instructions for producing output data. The library of application-specific functions 422 may include source programs for the map, combiner, reduce and partition functions as well as the corresponding compiled programs, represented by binary files 212 and 312 in FIGS. 2 and 3, respectively.

One or more status tables 444 are also included to track tasks and processes, as described with respect to FIGS. 7A and 7B. In some embodiments, the computer system 400 includes worker processes 438, intermediate data (e.g., files) 440, and one or more master process(es) 442. The interaction of worker processes 438 and master processes 442 were described with respect to FIG. 3.

Referring to FIGS. 2, 3 and 4, an application programmer can create a script or program using the library of application-specific functions 422, which include one or more functions 424, 425 426 and 428. The script or program is processed into binary files 212, 312 and provided to the work queue master 214, 314.

For the embodiment shown in FIG. 2, input data (e.g., files) 202 are split into multiple data blocks and assigned by the work queue master 214 to individual, application-independent map and reduce processes 204 and 208. The processes 204 invoke map programs 432 to process the input data (e.g., counting the number of occurrences of a term) to provide intermediate data values. In some embodiments, the input data is structured in the form of key-value pairs. The selected partition program 436 performs a partition operation using a partition function to partition (e.g., divide) the intermediate data from the intermediate data blocks into one or more groups of intermediate data 440 (sometimes called partitions), which are stored on the FS 446. The intermediate data values are processed by the map and reduce processes 204 and 208, which invoke reduce functions 208 for sorting and combining intermediate data values having the same key, and for storing the key and values in output data (e.g., in one or more output files) 210 located on the FS 446. The work queue master 214 manages the map and reduce processes 204 and 208 with the assistance of status tables 444, as described with respect to FIGS. 7A and 7B.

For the embodiment shown in FIG. 3, input data (e.g., files) 302 are split into multiple data blocks and assigned by the master process 442 to individual, application-independent worker processes 438. The worker processes 438 invoke one or more of the map programs 432 for operating on blocks of input data (e.g., counting the number of occurrences of a term) to provide intermediate data values. A selected one of the one or more partition programs 436 partitions the map output into one or more groups of intermediate data 440 (sometimes called partitions), which are stored locally in memory 412. The intermediate data values are processed by application-independent worker processes 438, which invoke one or more of the reduce programs 434 for sorting and combining intermediate data values having the same key, and for storing the resulting output data in one or more output files 310 located on the file system 446. The master process 442 manages the worker processes 438 with the assistance of status tables 444, as described with respect to FIGS. 7A and 7B.

Attention is now directed to FIG. 4B, which illustrates a library 422 of application-specific functions. In some embodiments a user selects an application-specific map function or an application-specific reduce function that is specifically tailored to the type of data processing application that the user is seeking to implement. Exemplary data processing applications are described in greater detail below.

In some embodiments application-specific map functions 424 include a default map function 450-A (e.g., a map function that will be used if the user does not specify a map function to use); a map function with user-defined parameters 450-B (e.g., a map function that is stored in the library but can be customized by the specification of parameters by the user); a user-defined map function 450-C (e.g., a map function that is provided by the user); a predefined map function 450-D that is not the default map function (e.g., the user can switch from the default map function without specifying any parameters); and optionally additional application-specific map functions.

In some embodiments application-specific combiner functions 425 include a default combiner function 452-A (e.g., a combiner function that will be used if the user does not specify a combiner function to use); a combiner function with user-defined parameters 452-B (e.g., a combiner function that is stored in the library but can be customized by the specification of parameters by the user); a user-defined combiner function 452-C (e.g., a combiner function that is provided by the user); a predefined combiner function 452-D that is not the default combiner function (e.g., the user can switch from the default combiner function without specifying any parameters); and optionally additional application-specific combiner functions.

In some embodiments application-specific reduce functions 426 include a default reduce function 454-A (e.g., a reduce function that will be used if the user does not specify a reduce function to use); a reduce function with user-defined parameters 454-B (e.g., a reduce function that is stored in the library but can be customized by the specification of parameters by the user); a user-defined reduce function 454-C (e.g., a reduce function that is provided by the user); a predefined reduce function 454-D that is not the default reduce function (e.g., the user can switch from the default reduce function without specifying any parameters); and optionally additional application-specific reduce functions.

In some embodiments application-specific partition functions 428 include a default partition function 456-A (e.g., a partition function that will be used if the user does not specify a partition function to use); a partition function with user-defined parameters 456-B (e.g., a partition function that is stored in the library but can be customized by the specification of parameters by the user); a user-defined partition function 456-C (e.g., a partition function that is provided by the user); a predefined partition function 456-D that is not the default partition function (e.g., the user can switch from the default partition function without specifying any parameters); and optionally additional application-specific partition functions. In some embodiments, the parameters include the type of key to use, such as a hash function, and the number of keys (e.g., the number of partitions). In some embodiments, when the parameters indicate that the map function includes calculating a key using a hash function, the parameters also indicate the depth of the hash function and the subset of digits of the hash function to use (e.g., "the last X digits" or "the first X digits").

Exemplary Large-Scale Data Processing Implementations

In some embodiments, each large-scale data processing implementation has a goal, input data, an application-specific map function, intermediate data, a partitioning function (which may or may not be application-specific), an application-specific reduce function, and output data. The following examples are merely for illustrative purposes and do not limit the scope of the disclosed system and method.

Example 1

Goal: sort data (e.g., sort words alphabetically by first letter).
Input Data: the keys are "words" and the values are "definitions" (e.g., the contents of a dictionary).
Application-specific Map Function: "do nothing" (e.g., the input data is the intermediate data).
Application-specific Partitioning Function: prefix partitioning where the first N bits of the key are used to determine which partition to send the key-value pair to (e.g., there are 26 partitions, each partition corresponding to a letter of the alphabet and all the words starting with "A" are sent to the first partition, all the words starting with "B" are sent to the second partition, and so on).
Application-specific Reduce Function: "do nothing" (e.g., the intermediate data is the output data).
Output Data: a list of the dictionary words and definitions sorted alphabetically (e.g., sorted by the first letter of the word).

Example 2

Goal: merge newly crawled or recrawled pages into a websearch index.
Input Data: the keys are the uniform resource locator (e.g., URL) of each web page and the values are all metadata about the respective webpage.
Application-specific Map Function: parse the crawled page, and extract the URL from the crawl record.
Partitioning Function: anything which balances the load such as fingerprint partitioning (e.g., taking the hash of the entire key, and using a subset of the bits in the hashed value to determine the partition to assign the key-value pair to).
Application-specific Reduce Function: choose the "best" version of a plurality of web pages with identical URLs (e.g., where "best" is "the newest version which is not an error page").
Output Data: "best" version of the web page for each URL.

Example 3

Goal: remove duplicates of web pages stored in a database of web pages (e.g., remove one of, www.globeandmail.com and www.globeandmail.ca, because both of the URLs lead to the same webpage).
Input Data: the contents of all web pages in the database of web pages and metadata about each of the webpages.
Application-specific Map Function: compute a hash of the contents of each web page (e.g., output the hash as the key, and a record with all of the metadata about the web page as a value).
Partitioning Function: anything which balances the load such as fingerprint partitioning such as by using a subset of the bits of the key (e.g., the hash of the contents of each web page) to assign the intermediate data to a partition (e.g., prefix-partitioning by using high order bits of the hash value, or mod-partitioning by using low order bits of the hash value).
Application-specific Reduce Function: Choose the "best" version of the plurality of web pages with the same hash value (e.g., where "best" is that the web page "has the prettiest URL" or "is on the most reliable server").
Output Data: Selected web page(s) or web page(s) to delete from the index.

Large-Scale Data Processing System III

One problem with conventional methods for large-scale data processing is that in some situations, disk seeks (or equivalent data retrieval operations) dominate running time of the data processing job. In some embodiments, as discussed in greater detail below, a mixture of early assignment of partitions to reduce processes (e.g., assignment of all partitions while the map processes are still producing intermediate data) combined with opportunistic partition replication and subpartitioning can provide load balance and avoid these seeks. Assigning all partitions to reduce processes during the map process allows the reduce processes to receive the intermediate data from high speed memory (random access memory or other memory from which data can be returned in a constant "seek time") rather than from low speed memory (e.g., optical disks, magnetic discs and tape storage which rely on the movement of the media and thus "seek time" varies and is on average substantially longer than the seek time for high speed memory such as random access memory).

Figure 8:
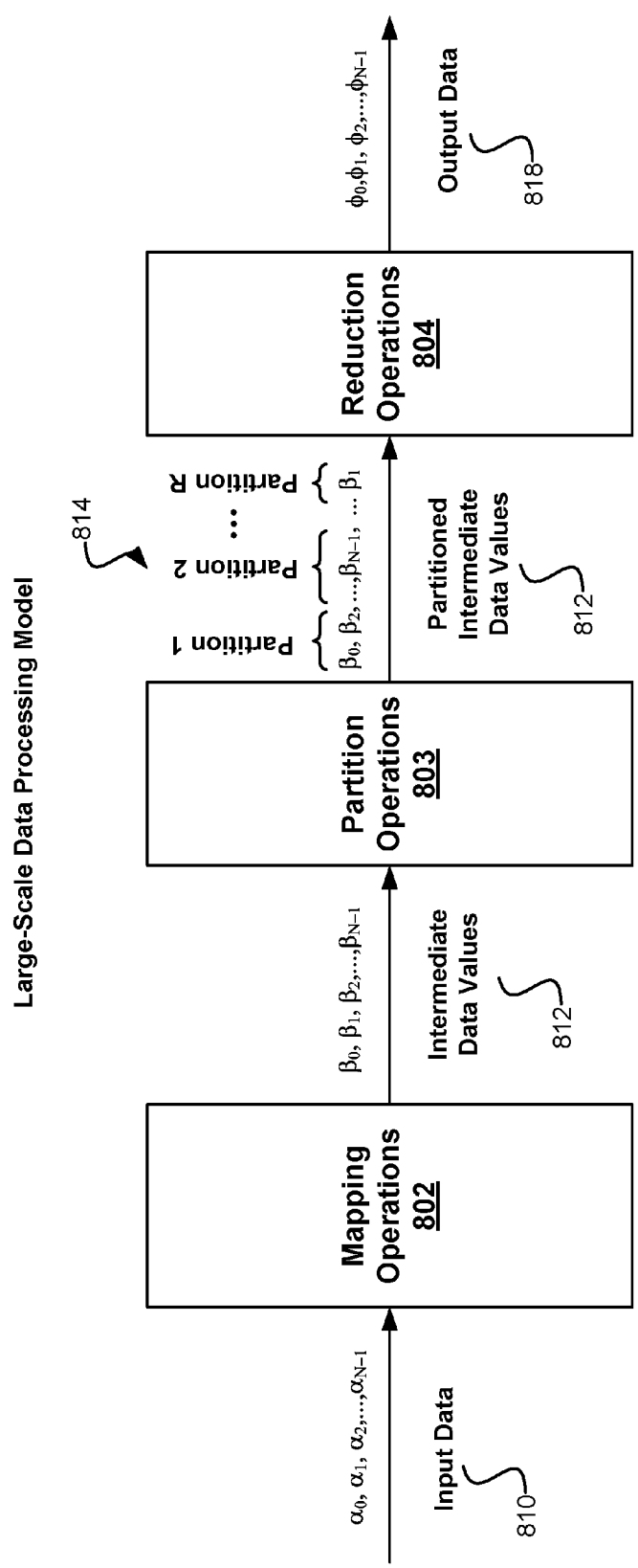
FIG. 8 is a block diagram of a large-scale data processing model, in accordance with some embodiments.

In some embodiments, methods are employed to limit the impact of stragglers on a large scale data processing job using the large-scale data processing system 400 described in greater detail with reference to FIGS. 4A-4B. An overview of the data flow through this large-scale data processing system in accordance with some embodiments is provided in FIG. 8. Input data 810 (e.g., data supplied by a user or indicated by a user) is processed by mapping operations 802, which produce intermediate data values 812. The intermediate data values 812 are processed by a partition operation 803 (also called shuffle process), which produces partitions 814, with each partition including a subset of the intermediate data values 812. The partitions 814 are acquired by reduction operations 804, which produce output data. It is noted that a respective partition may include data generated by some or all of the mapping operations 802. Similarly, the intermediate data 812 generated by a single mapping operation 802 may be distributed, during partitioning, to some or all of the partitions 814.

Figure 9:
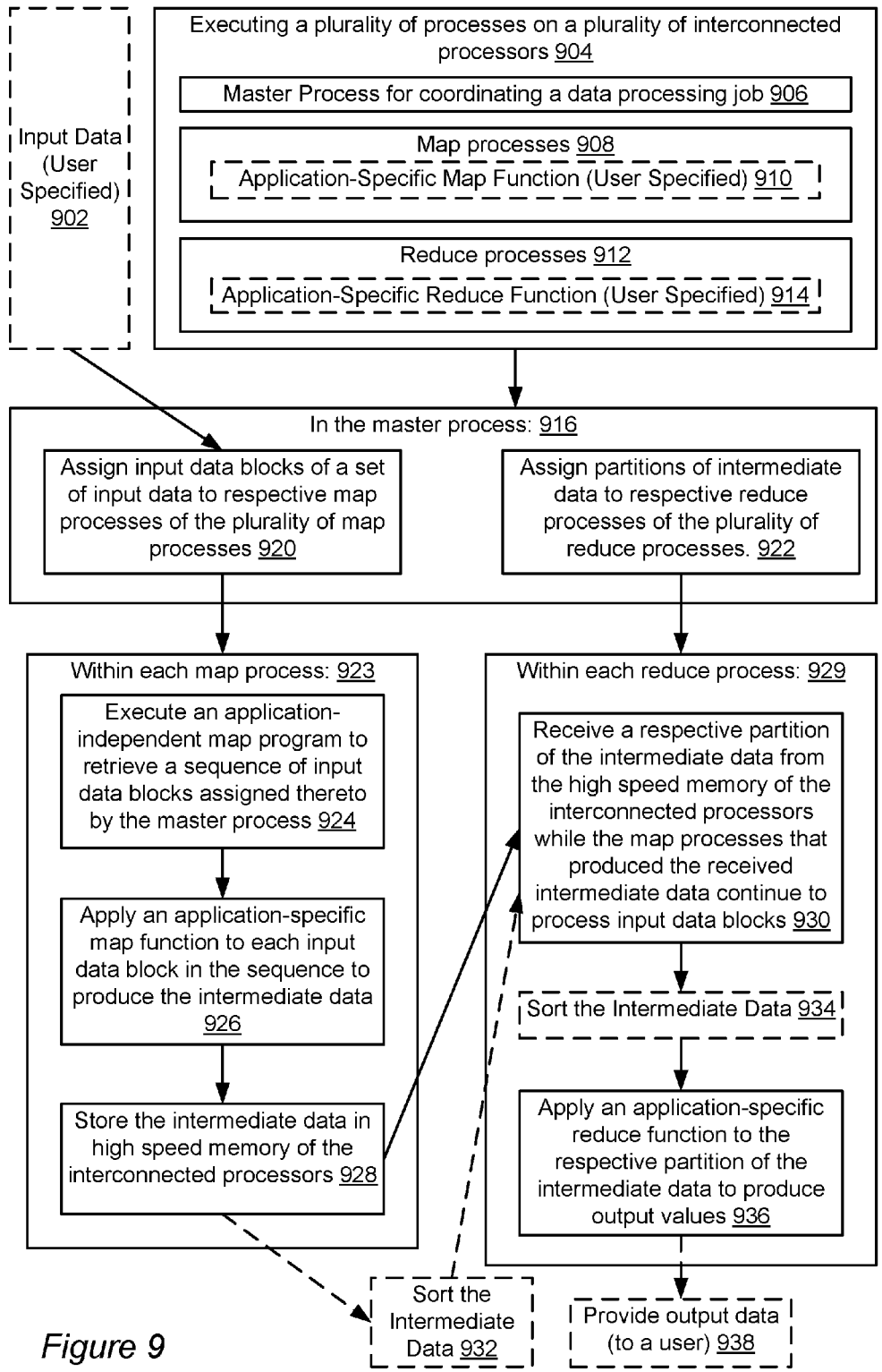
FIG. 9 is a flow diagram of processing input data into output data, in accordance with some embodiments.

Attention is now directed towards FIG. 9, which is a flow diagram of processing input data into output data, in accordance with some embodiments. In some embodiments input data is provided by or specified (902) by a user. In some embodiments the large scale data processing system executes (904) a plurality of processes on a plurality of interconnected processors, the plurality of processes including a supervisory process (e.g., a master process) for coordinating (906) a data processing job for processing a set of input data, and plurality of worker processes (e.g., including a plurality of map processes (908) and a plurality of reduce processes (912)). In some embodiments, the map processes (908) include one or more application-specific map functions specified (910) by the user. In some embodiments the reduce processes (912) include one or more application-specific reduce functions specified (914) by the user.

In some embodiments, the master process (916), assigns (920) input data blocks of a set of input data to respective map processes of the plurality of map processes and assigns (922) partitions of intermediate data to respective reduce processes of the plurality of reduce processes. In some embodiments, in (923) each of the plurality of map processes: the process executes (924) an application-independent map program to retrieve a sequence of input data blocks assigned thereto by the master process and to apply an application-specific map function to each input data block in the sequence to produce the intermediate data; and stores (926) the intermediate data in high speed memory of the interconnected processors.

In some embodiments, producing the intermediate data includes: producing a plurality of blocks of intermediate data, wherein each block of intermediate data includes all of the intermediate data produced by applying the application-specific map function to a respective block of input data. In some embodiments, receiving a respective partition of the intermediate data includes receiving a subset of the intermediate data in a first block of intermediate data that is associated with the respective partition, while a second block of intermediate data is being produced, the second block of intermediate data including at least some intermediate data that is associated with the respective partition.

In some embodiments, the map processes initially store intermediate data in high speed memory (e.g., a high speed random access buffer memory) and then write the data to low speed memory (e.g., a magnetic or optical disk with slower average read-write speeds). In some embodiments the high speed memory is erased based on a predefined cache replacement policy (e.g., least recently used, least recently written, oldest, etc.). In some embodiments, the partitions are assigned to reduce processes prior to the processing of the input data blocks by the map processes. In some embodiments, each reduce processes is configured to begin receiving intermediate data associated with each respective partition that is assigned to it by the master process before the intermediate data is erased from the high speed memory in accordance with the predefined cache replacement policy. In some embodiments, being configured to receive the intermediate data from the map processes before it is erased includes requesting the data from the map process at predetermined intervals each time that the reduce process becomes aware (e.g., is notified by the master process) that the map process has finished processing an input data block.

In some embodiments, in (929) each of the plurality of reduce processes, the reduce process receives (930) a respective partition of the intermediate data from the high speed memory of the interconnected processors while the map processes that produced the received intermediate data continue to process input data blocks. In some embodiments the data is sorted (930) into the plurality of partitions of the intermediate data before it is received by the reduce process. In some embodiments the intermediate data is sorted (932) into the plurality of partitions of the intermediate data after it is received by the reduce process. In some embodiments, the reduce process applies an application-specific reduce function to the respective partition of the intermediate data to produce output values.

Figure 10:
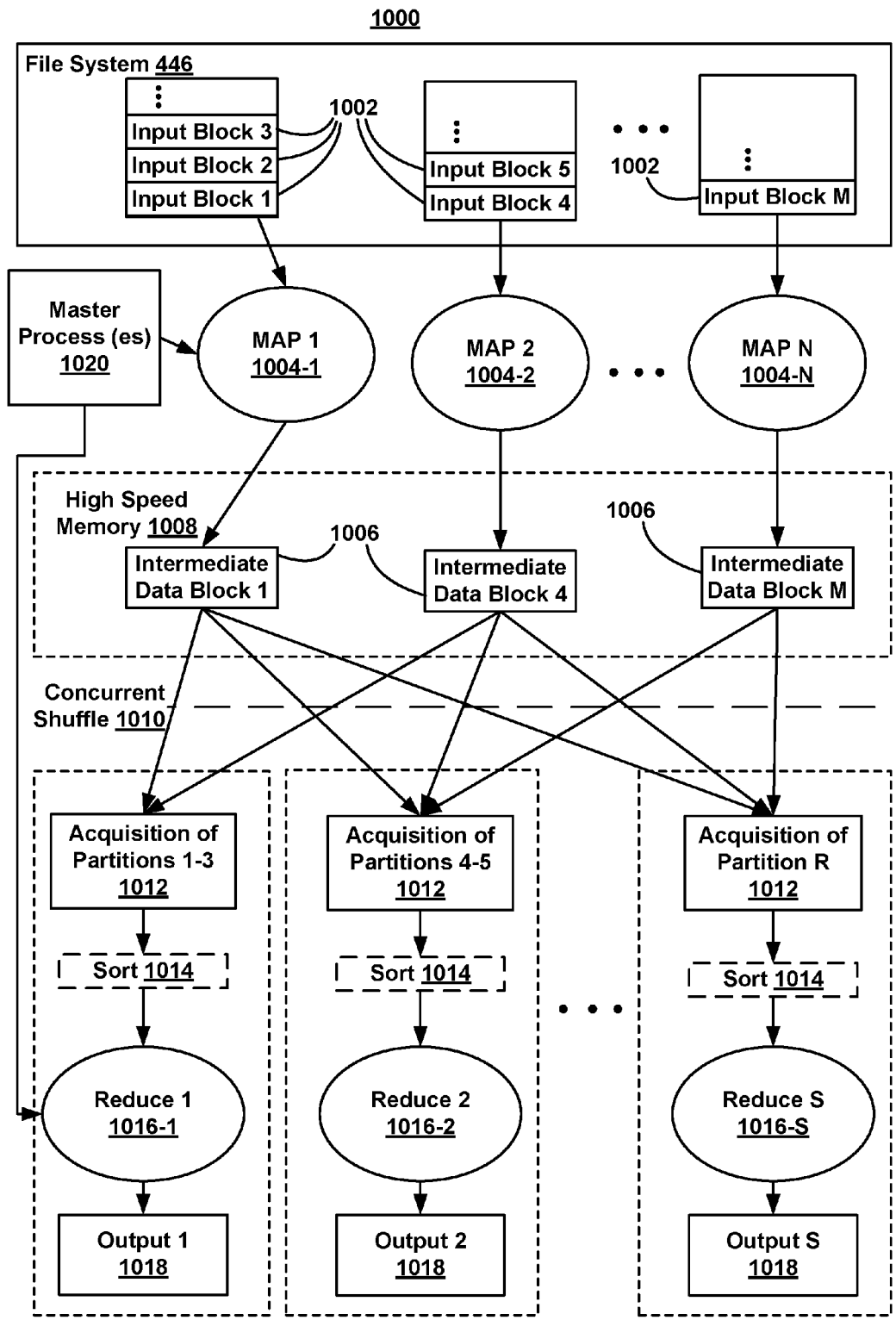
FIG. 10 is a block diagram of a large-scale data processing system, in accordance with some embodiments.

Attention is now directed towards FIG. 10, which a large-scale data processing system 1000, in accordance with some embodiments. The system 1000 provides application programmers with an application-independent framework for writing data processing software that can run in parallel across multiple different machines on a distributed network. The system 1000 is typically a distributed system having multiple processors, possibly including network attached storage nodes, that are interconnected by one or more communication networks. FIG. 10 provides a logical view of a system 1000, which in some embodiments may be implemented on a system having the physical structure shown in FIG. 5. In one embodiment, the system 1000 operates within a single data center of the system 500 shown in FIG. 5, while in another embodiment, the system 1000 operates over two or more data centers of the system 500.

As shown in FIG. 10, a set of input data blocks 1002, are processed by a first set of processes 1004, herein called map processes, to produce a set of intermediate data blocks 1006. In some embodiments, each input data block includes one or more input data items (e.g., files). In some embodiments, each intermediate data block includes one or more intermediate data items (e.g., files). The intermediate data blocks 1006 are stored in high speed memory 1008. In some embodiments, intermediate data blocks are also written to low speed memory and are erased (e.g., marked for deletion or deleted) from high speed memory based on predetermined criteria.

The intermediate data items in the intermediate data block 1006 are divided into partitions (e.g., based on a hash function of the key where the intermediate data items are a key-value pair). The process of delivering intermediate data items into partitions directly from the high speed memory 1008 is called a concurrent shuffle 1010. The partitions are acquired 1012 by the reduce processes. In some embodiments the partitions are acquired by the reduce process "pulling" the intermediate data associated with the partition from the map processes (e.g., the reduce process sends periodic requests to the map processes for all data having a key value that meets a predefined condition). In some embodiments the partitions are acquired by the map process "pushing" the intermediate data associated with the partition to the reduce process associated with the partition to which the intermediate data belongs (e.g., the map process sends each intermediate data item to a reduce process before it is deleted from the high speed memory).

In some embodiments, the partitions are sorted 1014 after being acquired by the reduce processes. In some embodiments the partitions are processed by a second set of processes 1016, herein called reduce processes, to produce output data 1018 by applying an application-specific function to the intermediate data. Generally each "map process" is a process configured (or configurable) to perform map operations by and executing an application-specific map function. Each "reduce process" is a process configured (or configurable) to perform reduce operations and by executing an application-specific reduce function. A control or supervisory process, herein called the work queue master, controls the set of processing tasks. As described in more detail below, the master process 1020 determines how many map tasks to use, how many reduce tasks to use, which processes and processors to use to perform those tasks, where to store the intermediate data and output data, how to respond to any processing failures, and so on.

It should be noted that the master process 1020 assigns tasks to processes, and that multiple (map, combiner, partition and/or reduce) processes may be executed by each of the processors in the group of processors that are available to do the work assigned by the master process 1020. In the context of FIG. 5 or any other multiple processor system, the set of processes controlled by the master process 1020 may be a subset of the full set of processes executed by the system, and furthermore the set of processors available to do the work assigned by the master process 1020 may be fewer than the full set of processors in the system. Some of the resources of the system may be used for other tasks, such as tasks that generate the input data 1002, or that utilize the output data 1018. However, in some embodiments, some or all of the tasks that generate the input data 1002 or utilize the output data 1018 may also be controlled or supervised by the master process 1020. In addition, in some embodiments processors can be added or removed from the processing system during the execution of a map-reduce operation. The master process 1020 keeps track of the processors in the system and the available processes executing on those processors.

Application programmers are provided with a restricted set of application-independent programs (e.g., map programs, partition programs, reduce programs) for reading input data and generating output data. The programs contain procedures for automatically handling data partitioning, parallelization of computations, fault tolerance (e.g., recovering from process and machine failures) and I/O scheduling. In some embodiments, to perform a specific data processing operation on a set of input data (e.g., files), the only information that must be provided by an application programmer provide is: information identifying of the input file(s), information identifying or specifying the output data (e.g., files) to receive output data, and two application-specific data processing functions, hereinafter referred to as map( ) and reduce( ). Generally, the map( ) function specifies how input data is to be processed to produce intermediate data and the reduce( ) function specifies how the intermediate data values are to be merged or otherwise combined. Note that the disclosed embodiments are not limited to any particular type or number of functions. Other types of functions (e.g., data filters) can be provided, as needed, depending upon the system 1000 architecture and the data processing operations required to produce the desired, application-specific results. In some embodiments, the application programmers provide a partition function, in addition to the map( ) and reduce( ) functions. The partition( ) function, specifies how the intermediate data is to be partitioned when the intermediate data is provided to the reduce processes.

Referring to FIGS. 10 and 5, in some embodiments the input data (e.g., files) 1002 are stored in one or more data centers DC1-DC4. Ideally, the master process 1020 214 assigns tasks to processors 510 in datacenters where the input data (e.g., files) are stored so as to minimize network traffic whenever possible. In some embodiments, the master process 1020 uses input file information received from a file system to determine the appropriate processor or process for executing a task, using a hierarchical decision process. When a process in a processor in a datacenter DC1-DC4 is idle, it requests a task from the master process 1020. The master process 1020 searches the input file information received from the file system (e.g., FS 446, FIG. 5), for an unprocessed data block on the machine assigned to process the task. If none are available, the master process 1020 searches the file information for an unprocessed data block on the same rack 508 as the machine assigned to process the task. If none are available, the master process 1020 searches the file information for an unprocessed data block in the same datacenter as the machine assigned to process the task. If none are available, the master process 1020 will search for unprocessed blocks in other datacenters.

By using a hierarchical assignment scheme, data blocks can be processed quickly without requiring large volumes of data transfer traffic on the network 500. This in turn allows more tasks to be performed without straining the limits of the network 500.

Task Management

Referring again to FIG. 2, application programmers develop the map( ) and/or reduce( ) functions, which are computer programs that process input data and intermediate, respectively. In some embodiments these functions are compiled into binary files suitable for use on a particular processing platform. In some embodiments, the master process 1020 loads (or causes to be loaded) onto each process to which it allocates a map or reduce task, the parallelization procedures, and the application-specific map( ) or reduce( ) function required to perform the task assigned to the process.

The master process 1020, when it receives a request to process a set of data using a specified set application-specific map( ), reduce( ) and, optionally, partition( ) functions, determines the number of map tasks and reduce tasks to be performed to process the input data. This may be based on the amount of input data to be processed. For example, a job may include 10,000 map tasks and 10 reduce tasks. In some embodiments, the master process 1020 module generates a task status table having entries representing all the tasks to be performed, and then begins assigning those tasks to idle processes. As noted above, tasks may be allocated to idle processes based on a resource allocation scheme (e.g., priority, round-robin, weighted round-robin, etc.).

Process and Task Status Tracking

In some embodiments, the process and task status of map tasks and reduce tasks is tracked by the master process as described in greater detail above with reference to FIGS. 6, 7A-7B.

Map Phase

In some embodiments, the set of application-specific data processing operations that the map( ) function can perform is constrained. For example, in some embodiments, the map( ) function may be required to process the input data one record at a time, proceeding monotonically from the first record to the last record in the data block being processed. In some embodiments, the map( ) function may be required to generate its output data in the form of key-value pairs. Either the key or value or both can comprise structured data, as long as the data can be encoded into a string. For example, the key may have multiple parts, or the value may have multiple parts.

By requiring the map( ) function's output to be in the form of key-value pairs, the resulting intermediate data can be mapped to a set of intermediate data (e.g., files) in accordance with a partition( ) function. An exemplary partition( ) function may specify that all intermediate data is to be directed to an intermediate file corresponding to the value of the first byte of the key. Another exemplary partition( ) function may specify that all intermediate data is to be directed to an intermediate file corresponding to the value of the function "hash(Key) modulo N", where N is a value specified by the application programmer and "hash(Key)" represents the value produced by applying a hash function to the key of the key-value pairs in the intermediate data. In some embodiments, the partition function is always a modulo function and the application programmer only specifies the modulus to be used by the modulo function.

In some embodiments, the input data blocks are automatically assigned to map processes in an application-independent manner, by the master process 1020. In particular, the master process 1020 is configured to determine the number of data blocks to be processed, and to create a corresponding number of instances of the map process 1004. Stated in another way, the master process 1020 assigns a corresponding number of map tasks to processes, as suitable processes become available. Since the number of map tasks may exceed the number of processes available to the master process 1020, the master process 1020 will assign as many map tasks as it can to available processes, and will continue to assign the remaining map tasks to processes as the processes complete previously assigned tasks and become available to take on new tasks. The master process 1020 uses the task status table and process status table, described above, to coordinate its efforts.

Partition Phase

When the processing of a partition by a reduce process fails, the processing of the partition must be restarted. Using conventional methods of large-scale data processing, this requires shuffling, sorting and reducing the partition from scratch. The running time of these processes is roughly proportional to the size of the partition (e.g., the number of intermediate data values in the partition). Thus it is helpful to use small partitions: as each partition completes, it checkpoints its progress. With smaller partitions, these checkpoints are more frequent, reducing the work redone on failure.

In some embodiments it is beneficial to modify the large-scale data process to allow it to efficiently execute computations with many partitions per reduce process. Using conventional methods a reduce process could only shuffle intermediate data to produce one partition at a time. Thus, in order to use N partitions, users had to either run N reduce processes, which limited N to the available parallelism, or run w<N reduce processes that shuffled and reduced in N/w waves. When the first wave of shuffling (e.g., partitioning) executes, typically data is shuffled as soon as it is produced by the map processes, which means that the data is still in the high speed memory. For the second and subsequent waves the data has been flushed to disk (e.g., erased from the high speed memory in accordance with a cache replacement policy), and shuffling can cause many expensive (e.g., slow) disk seeks. To avoid these disk seeks, the system and method disclosed herein assigns partitions to reduce processes aggressively (e.g., by assigning a partition to a process while the process already has an unprocessed partition), and perform all shuffling concurrently. For large-scale data processing operations where sorting is a bottleneck, this adds parallelism to the sort process. The downside of doing aggressive partition assignment is it takes away the flexibility to dynamically assign partitions to processes to address load imbalance, however this potential downside is addressed using partition replication and subpartitioning as discussed in greater detail below with reference to FIGS. 12A-13B.

Figure 11:
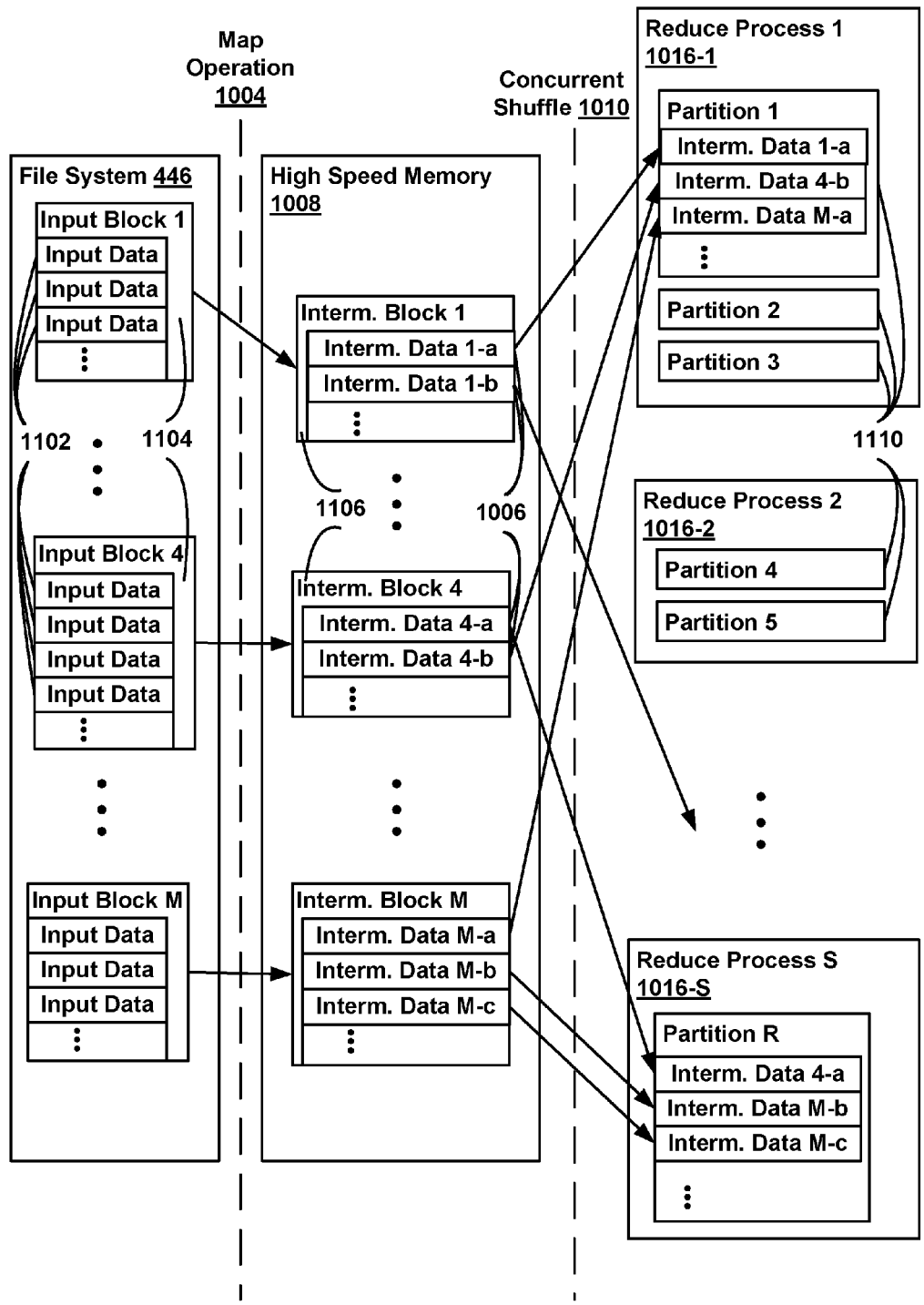
FIG. 11 is a block diagram illustrating data as it is processed by a large-scale data processing system.

Attention is now directed towards FIG. 11, which illustrates data as it is processed by a large-scale data processing system. A map-reduce operation has three major phases: map, partition, and reduce. These phases are performed by two groups of processes, the map processes and reduce processes, which run distributed over a cluster of computers.

In some embodiments, the map operation 1004 reads the input data items 1102 in an input data block 1104 as a series of key-value pairs, passes the data block 1104 through an application-specific map function, and this function produces an intermediate data block 1106 including intermediate data 1006 (e.g., intermediate data 1-a, intermediate data 1-b, intermediate data 4-a, intermediate data 4-b, intermediate data 4-c, etc.) that is read as a new series of key-value pairs. The calculations performed in a map-reduce operation are independent of the order of input processing. Dividing input data into input data blocks allows the input data to be fragmented into many input blocks as discussed in greater detail above with reference to FIG. 9. In some embodiments, these input blocks are assigned to map processes as they become idle. In some embodiments, when there are stragglers in the map phase of a map-reduce operation, the number of input blocks is increased (e.g., decreasing the unit of work used for load balancing at the cost of increasing metadata overhead). In some embodiments, time in the map phase of computation is dominated either by reading the input data, or executing the user-specified map function.

The intermediate data block is stored on disk (for failure recovery), and then sent from the map processes to the appropriate partition 1110 in a respective reduce process in the shuffle phase (e.g., this phase groups the intermediate data in the intermediate data block by key). In some embodiments the shuffle process is a concurrent shuffle 1010, when the intermediate data 1006 is transferred directly from the high speed memory 1008 to memory associated with the reduce process 1016.

A user-provided (or default) partitioning function determines which intermediate data will be placed in which partition. The shuffle phase (e.g., concurrent shuffle 1010) actually accomplishes two goals: (i) collecting all of the data to be processed by a single partition into one location (e.g., the memory associated with a respective reduce process 1016); and (ii) moving this data from the map processes to the reduce process which will process this partition. In some embodiments these steps are performed separately. In some embodiments, to avoid copying data over the network twice we prefer both steps are accomplished simultaneously by the concurrent shuffle 1010.

It should be understood that the intermediate data blocks 1106 stored on disk interleave intermediate data items 1006 (e.g., key-value pairs) destined for many distinct partitions, and hence reading the data destined for a single partition may generate many disk seeks. In order to avoid unnecessary disk seeks (which can dramatically slow down the large-scale data processing operation), in some embodiments a concurrent shuffle 1010 is arranged such that the shuffle process for all partitions keeps up with the map operation, so that data is shuffled from the operating system high speed memory (e.g., buffer cache) rather than being retrieved from low speed memory (e.g., magnetic disk, optical disk or some other computer readable storage medium with slower read speeds than the high speed memory).

Sometimes a default partitioning function for a map-reduce operation creates partitions much larger than the average. There are two reasons: (1) too many keys are put into the same partition, and (2) there is a key with many values. Then, even if the number of partitions gets increased, an outlier large partition may still exist. In some embodiments, to address imbalanced partition sizes the present method and system allows the user to specify a custom partitioning function to partition the keyspace into partitions (e.g., the user can use special knowledge of the problem being solved makes it easy to derive or select a balanced partitioning function). In some embodiments, to address a large partition (e.g., a partition with a long runs of values) the present method and system attempt to accelerate the processing of the large partition.

In some embodiments the processing of the large partition is accelerated by the master identifying the partition with the run and scheduling the large partition to be executed on a high-capacity process. This high-capacity process may be scheduled on a faster computer, or on a process with fewer tasks competing for the machine's resources. For this approach to work, the outlier partitions must be identified early, in some embodiments the master process can do this by extrapolating from the initial intermediate data block. In some embodiments once an outlier (e.g., a large partition) is identified, a backup of the original partition is scheduled on a high capacity process. The number of partitions which can be addressed by this technique is limited by the number of high-capacity processes allocated by the user to a map-reduce operation run: users must balance the gains of this technique against the resource cost.

Reduce Phase

Application-Specific Reduce-Combiner Function

In some embodiments the master process (e.g., work queue master) is configured to identify large partitions (e.g., long runs of data which can not be broken through subpartitioning), and the master process initiates a reduce-side combiner in order to make the sizes of partitions more uniform by overlapping a portion of the reduce phase with the map phase of computation. In some embodiments, the master process (e.g., work queue master) identifies a partition that is likely to delay the data processing job using predefined criteria (e.g., that the partition is substantially larger than the average partition size) and takes a remedial action (e.g., scheduling on a high capacity process or beginning to reduce that partition before the map processes have completed). Typically, when it is advantageous to use a reduce-side combiner, a user (e.g., an application programmer) will specify that an application-specific combiner function should be used as part of the reduce process and, in some embodiments the user (e.g., the application programmer) will specify the particular application-specific combiner function that is to be initiated by the master process.

In some cases, there is significant repetition in the intermediate data keys produced by each map task, and the application-specific reduce function is both commutative and associative. When all these conditions apply, a special optimization can be used to significantly reduce execution time of the map-reduce task. An example of a situation in which the optimization can be applied is a map-reduce operation for counting the number of occurrences of each distinct word in a large collection of documents. In this example, the application-specific map function outputs a key-value pair for every word w in every document in the collection, where the key-value pair is <w, 1>. The application-specific reduce function for this example is:

```
input data is "values";
int result=0; // initialize result to zero
for each v in values:
    result += ParseInt(v);
output: <key, result>
```

It should be understood that, in accordance with some embodiments, even when the application-specific reduce function is not both associative and commutative the master process is instructed (e.g., by an application programmer) to initiate a reduce-side combiner function. In some of these embodiments, the reduce-side combiner function is an application-specific combiner function that is distinct from the application-specific reduce function. As one example of these embodiments: the intermediate data is in the form of a key-value pair such as <key, [count, sum]>; and the application-specific reduce function is a function for calculating an average (e.g., arithmetic mean) by, for all key-value pairs with a particular key, summing the "count" values and summing the "sum" values to get a value of total_sum and total_count, and dividing total_sum by total_count to get the average value (e.g., arithmetic mean) for the particular key. In this example, even though the application-specific reduce function is not both associative and commutative, it would be possible (and frequently advantageous) to use reduce-side combiner function to sum the "count" values and sum the "sum" values for a subset of the key-value pairs that have the particular key to get a plurality of combined intermediate key-value pairs of the form <key, [total_count, total_sum]> for the particular key. These combined intermediate key-value pairs can subsequently be processed by the reduce function to generate the average value for the particular key as described in greater detail above.

Each map task in this example will produce hundreds or thousands of records of the form <word, 1>. The reduce function simply adds up the count values. To help conserve network bandwidth for map-reduce operations that satisfy these properties, the user may provide an application-specific combiner function. The combiner function is invoked with each unique intermediate data key and a partial set of intermediate data values for the key that are stored in the buffer (e.g., high speed memory of the reduce process).

A reduce combiner invokes the combiner function on a buffer of shuffled and sorted data before writing the data to disk, decreasing the amount of data written to disk and the amount of data to be reduced after the shuffle is complete. This reduce combiner is most effective at reducing long runs of values with a common key, and hence decreases the variance in partition size caused by these long runs.

This is similar to the reduce function, except that it gets executed while the reduce process is receiving intermediate data for a respective partition, instead of after the respective partition has been completely acquired by the reduce process. The combiner function partially summarizes the intermediate data (e.g., key-value pairs) before the intermediate data is written to low speed memory associated with the reduce process. In fact, when using a combiner function, the same function is typically specified for the combiner and reduce operations. The partial combining performed by the combiner operation significantly speeds up certain classes of Map-Reduce operations, in part by significantly reducing the amount of information that must be written from the reduce process buffer (e.g., high speed memory associated with the reduce process) to the reduce process disk (e.g., low speed memory associated with the reduce process). Additionally, the combiner operation allows the reduce process to pre-processes data during the map phase of computation, which means that less work must be done during the reduce phase of computation. In particular, the combiner can collapse long runs of values with the same key into a single key-value pair (using the word count example, it could replace <the,1>, <the,1>, <the,1> with <the,3>), or a reduced number of such key-value pairs, so when the large-scale data processing operation enters the reduce phase of computation the partitions are smaller and more equal in size.

Application-independent reduce modules 1016 read intermediate data values (e.g., key-value pairs) from the intermediate data 1106. In some embodiments, each reduce module 1016 reads from only one intermediate file 1106. In some embodiments, the reduce modules 1016 sort the intermediate data values, merge or otherwise combine sorted intermediate data values having the same key and then write the key and combined values to output data (e.g., one or more output files) 1018. In some embodiments, the intermediate file 1106 and the output data (e.g., files) 1018 are stored in a File System 446 (FS), which is accessible to other systems via a distributed network.

Software Implementation

In some embodiments, the map and reduce modules 1004 and 1016 are implemented as user-defined objects with methods to carry out application-specific processing on data using known object-oriented programming techniques. For example, a map-reduction base class can be created that includes methods and data for counting the number of input data files that contain a particular term or pattern of terms, sorting the results, eliminating duplicates in the sorted results and counting the number of occurrences of the term. In some embodiments, the system includes multiple base classes, and the library 422 includes multiple derived classes, derived from the base classes, to perform the various application-specific map, reduce, combine and partition functions. Application programmers can derive additional classes from the base classes and instantiate the base classes and derived classes as objects in the application code to access the functionality associated with those classes.

Partition Replication

In some embodiments a fast reduce process "replicates" a partition from a slow reduce process that is currently processing the partition or has not yet processed the partition (this process is referred to herein as "partition replication"). Partition replication avoids the need to reshuffle intermediate data to recreate a partition on the fast reduce process. Rather, the partition (e.g., partition 2), which has already been sorted and stored on the slow reduce process (e.g., 1016-1) during a shuffling process (e.g., 1010 in FIG. 11) is read directly from a computer readable storage medium associated with the slow reduce process (e.g., either high speed memory or low speed memory). In this way the partition is transferred using sequential reads in large pieces and from few sources, such as a computer readable storage medium associated with reduce process 1 1016-1 (e.g., either high speed memory or low speed memory), as opposed to shuffling from scratch that requires reading small pieces potentially from a thousands of sources (e.g., a computer readable storage medium associated with the map processes 1004 in FIG. 10) and resorting the intermediate data.

Figure 12A:
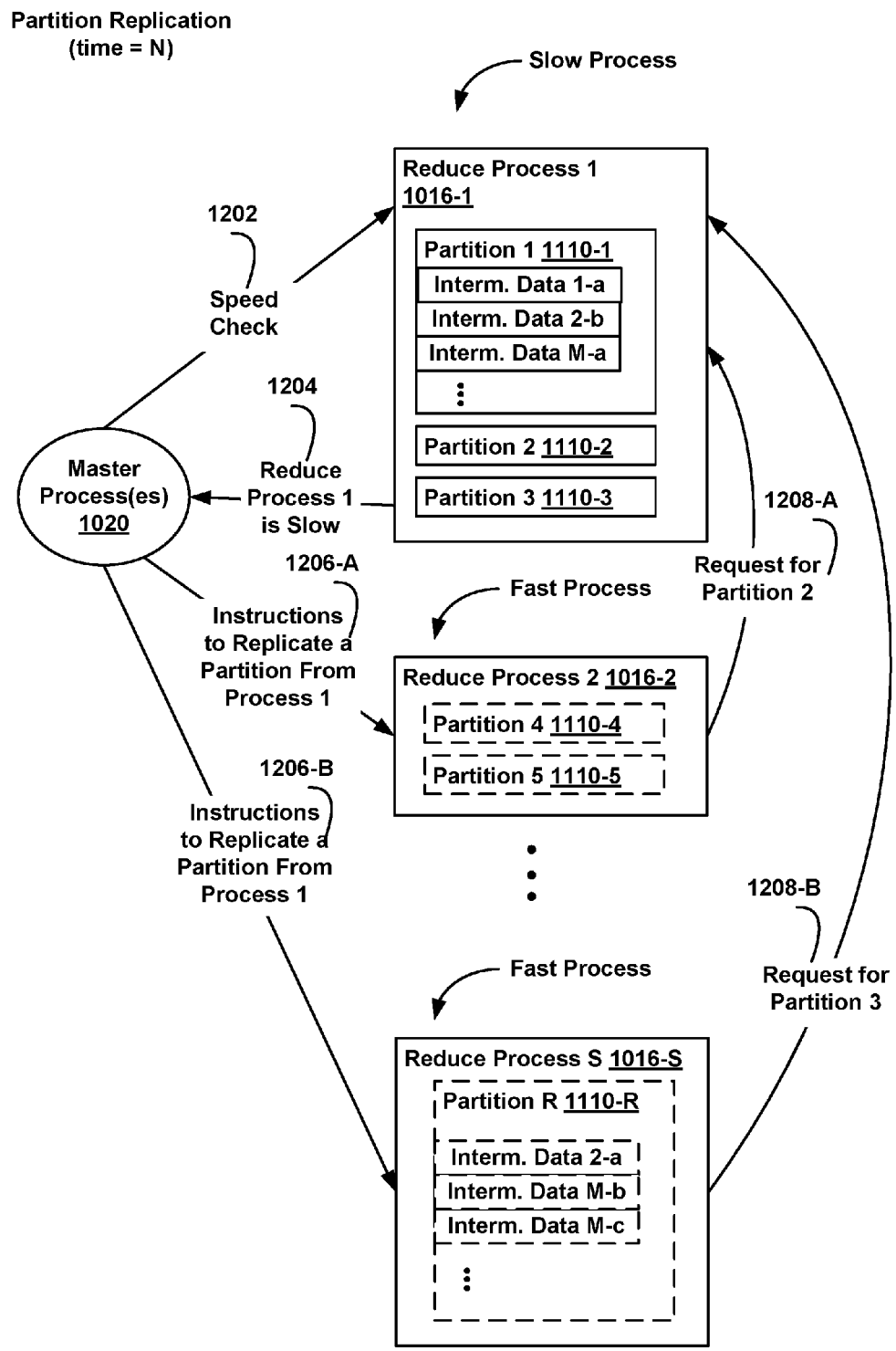
FIGS. 12A-12B are block diagrams illustrating a process for replication one or more partitions from a reduce process, in accordance with some embodiments.
Figure 12B:
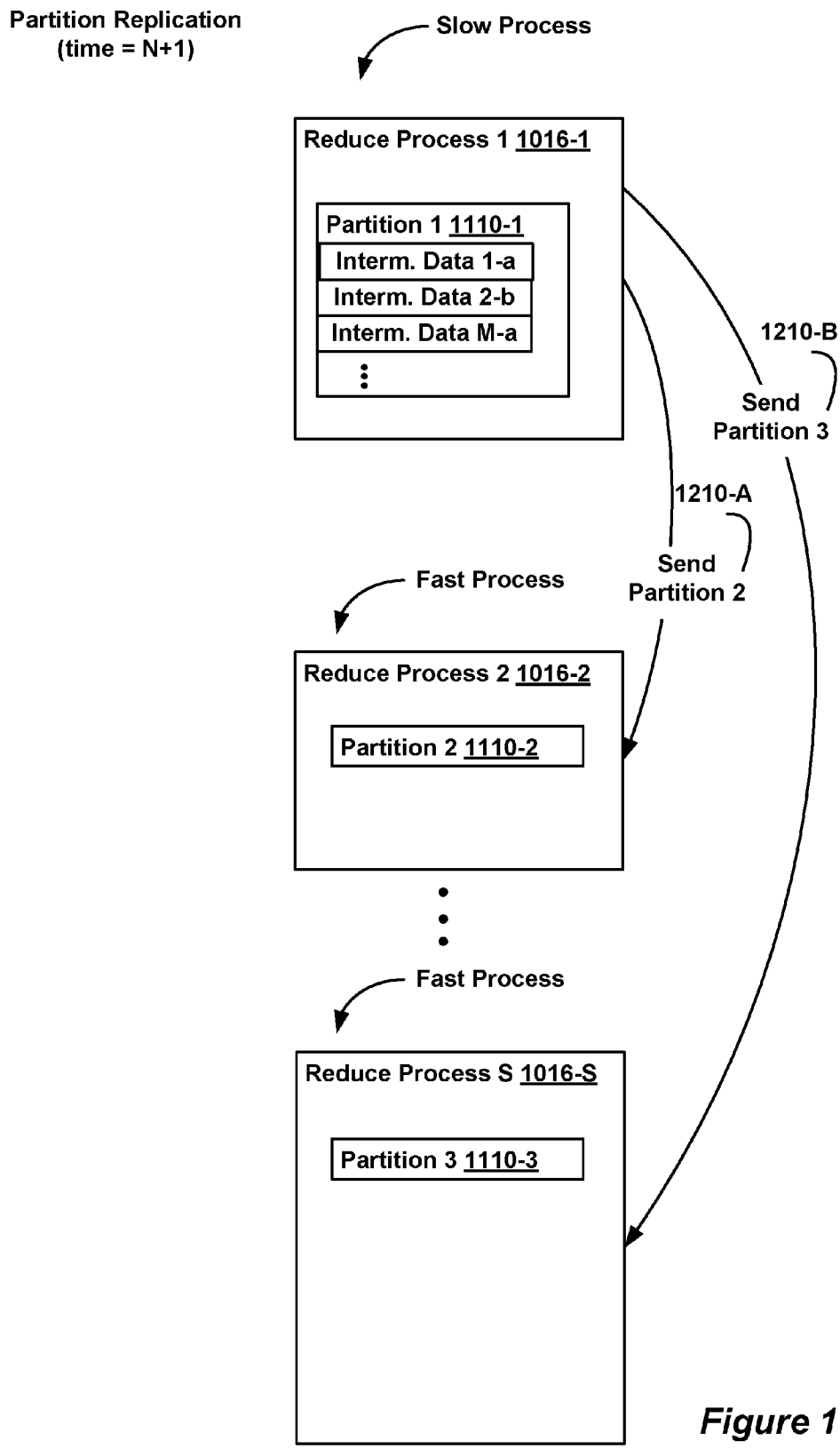

Attention is now directed towards FIGS. 12A-12B, which illustrate a process for load balancing (e.g., partition redistribution) in accordance with some embodiments. FIG. 12A is a block diagram illustrating a plurality of reduce processes (1016-1 through 1016-S) at time=N before partitions are replicated. FIG. 12B is a block diagram illustrating a plurality of reduce processes (1016-1 through 1016-S) at time=N+1 after partitions are replicated.

In some embodiments reduce processes (e.g., 1016 in FIG. 12A) receive multiple distinct partitions of the intermediate data. In some embodiments the reduce processes process the multiple partitions one at a time, in succession. In some embodiments the master process identifies a first reduce process (e.g., Reduce process 1 1016-1 in FIG. 12A) that is delaying the data processing job. In some embodiments the master process periodically checks 1202 the speed of each of the reduce processes. In some embodiments, checking the speed of a process includes one or more of: checking the number of partitions processed by the reduce process, checking the rate at which the reduce process is processing intermediate data, determining the approximate amount of time that it will take the reduce process to finish processing the partitions that it is processing.

In response to determining 1204 that one of the reduce processes is slow, the master process reassigns at least one of the multiple partitions (e.g., partition 2 or partition 3 in FIG. 12A), which has not yet been processed, to a second reduce process (e.g., reduce process 2, 1016-2 or reduce process S 1016-S in FIG. 12A). In some embodiments reassigning a partition includes providing instructions 1206 for the fast reduce process (e.g., reduce process 2 1016-2) to request 1208 the reassigned partition from the slow reduce process (e.g., reduce process 1 1016-1).

In some embodiments, shard replication includes copying/sending (1210) the intermediate data in the reassigned partition from the slow reduce process to the fast reduce process (e.g., at time=N+1 in FIG. 12B). In some embodiments identifying that a reduce process is delaying a data processing job includes determining that the reduce process in the last 10% to complete or that the reduce process is in the slowest 10% (e.g., by determining the rate at which the intermediate data is being processed by the reduce process), that the reduce process is projected to be in the last 10% to complete, or that the reduce process is processing a partition that is one of the largest partitions. The replicated partitions (e.g., partition 2 or partition 3 in FIG. 12B) are sent from the slow reduce process (e.g., reduce process 1 1016-1) to faster reduce processes (e.g., reduce process 2 1016-2 and reduce process S 1016-S in FIG. 2B).

In some embodiments, partitions are only reassigned to a process that has completed processing all partitions assigned to it. For example, when a reduce process A completes all of its work, the master process asks it to replicate an incomplete partition from a reduce process B nearby in the network (minimizing network bandwidth consumed by replication). In this example, reduce process A copies the sorted output and metadata from B, and then starts reducing the sorted output. In this example reduce process A may begin reducing the sorted output while the transfer is still in progress. Alternatively, reduce process A may wait until the transfer is complete before beginning to reduce the sorted output. In some embodiments a partition is reassigned to a reduce process that is projected to complete processing all of the partitions assigned to it within a predetermined time interval (e.g., the time it will take for the reduce process to acquire the reassigned process). In some embodiments the reassigned partition is shuffled from scratch and reduced.

It should be understood that partition replication is a form of job migration. Partition replication allows the master process to balance partitions across machines during the last stage of processing (e.g., after shuffling has completed) without incurring costly low speed memory seeks by avoiding reshuffling intermediate data. It should be understood that when choosing to use partition replication versus reshuffling to create a backup, there is a performance tradeoff. Partition replication imposes the additional load of being a data source on a machine the master process has already identified as lagging; but in return decreasing the number of disk seeks on all of the machines which would need to be contacted to reshuffle the data and avoids sorting the data again (and thus can significantly decrease the time to start the backup partition reducing).

Subpartitioning

In some embodiments it is desirable to get the benefits of having small partitions and the cost-savings of having larger partitions by using larger partitions for the bulk of the computation, and then splitting the delayed partitions (e.g., straggler partitions) into subpartitions on demand when finer granularity is desired.

In some embodiments, to create subpartitions the master process uses a subpartitioning function that takes a key and a number of subpartitions, and produces a plurality of sub-keys where the number of sub-keys corresponds to the desired number of subpartitions. Once the master has decided to split a partition s into k subpartitions, it assigns the subpartitions to reduce processes including the associated sub-keys for each assigned subpartition. In some embodiments, the reduce process shuffles the data for the entire partitions, filters the key-value pairs for its assigned subpartition and sorts them. In some embodiments, a balanced subpartitioning function (e.g., a hash mod function) is used so that the amount of data sorted and reduced for each subpartition is a 1/k fraction of the data of the original partition.

In some embodiments, subpartitioning is combined with partition replication, described in greater detail above with reference to FIGS. 12A-12B. It should be understood that the same tradeoff of imposing the additional load of being a data source on a machine the master process has already identified as lagging; but in return decreasing the number of disk seeks on all of the machines which would need to be contacted to reshuffle the data and avoids sorting the data again (and thus can significantly decrease the time to start the backup partition reducing).

In some embodiments, a simple greedy heuristic is used to decide what and when to subpartition in the current implementation. The master estimates the time to completion of each partition, based on the rate of shuffling and reducing. In some embodiments, the master periodically computes outliers among the completion times, and subpartitions each outlier into a predetermined number of subpartitions (e.g., three, five, seven or any reasonable number of subpartitions). In some embodiments, the user can control this process by specifying the maximum number of partitions to subpartition during a map-reduce operation run.

Figure 13A:
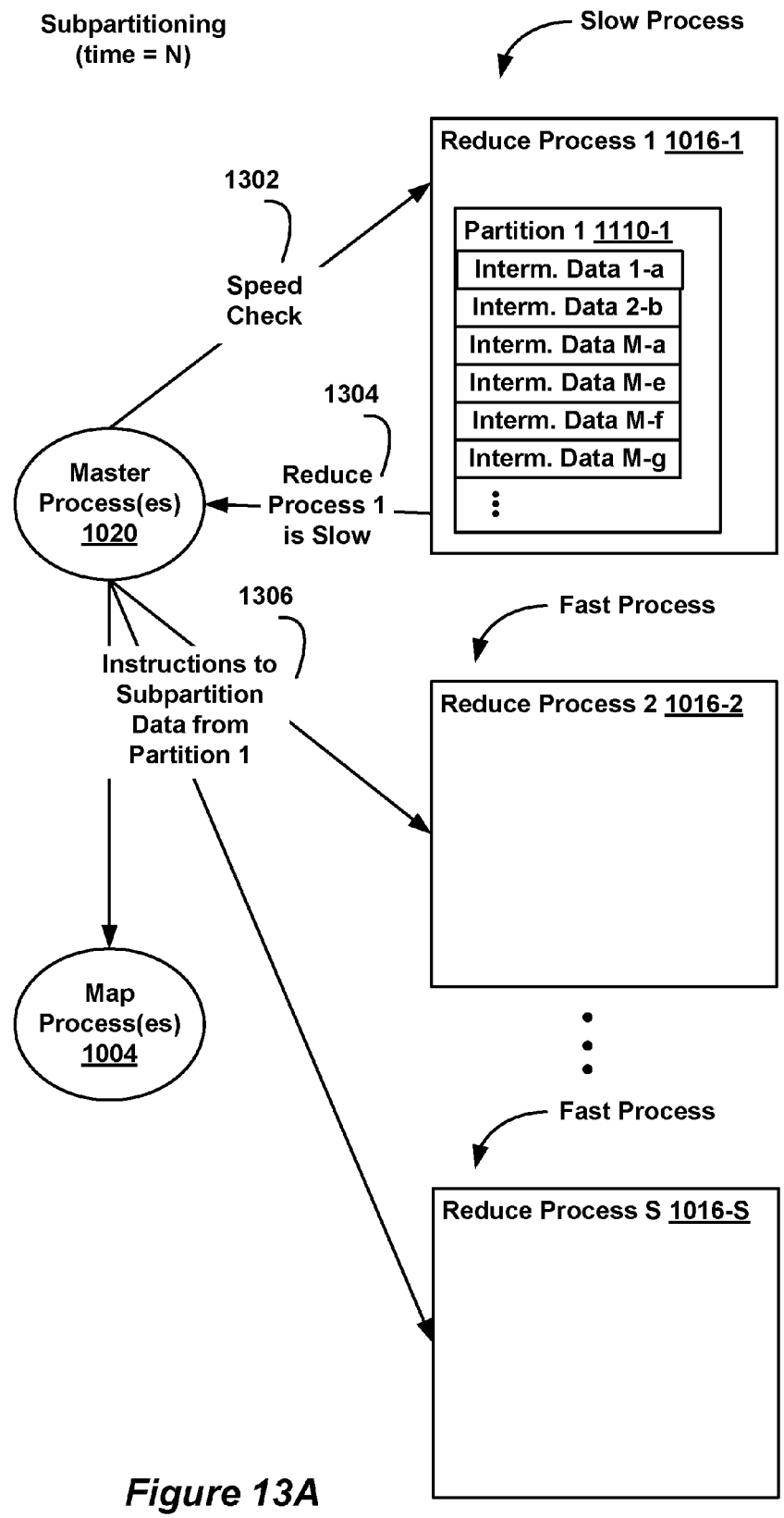
FIG. 13A-13B are block diagrams illustrating a process for subpartitioning a partition, in accordance with some embodiments.
Figure 13B:
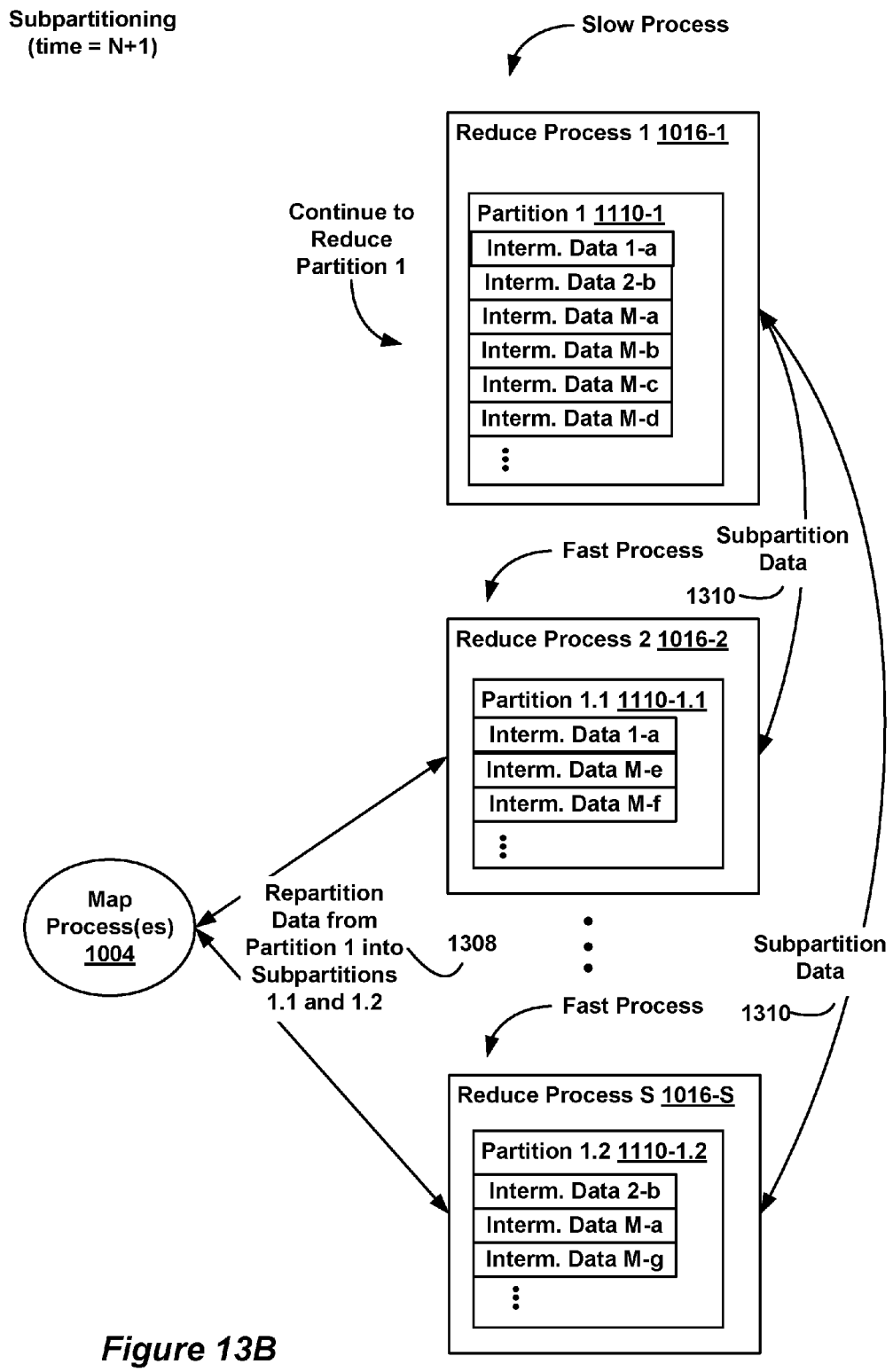

Attention is now directed towards FIGS. 13A-13B which illustrate a process for load balancing (e.g., partition redistribution) in accordance with some embodiments. FIG. 13A is a block diagram illustrating a plurality of reduce processes (1016-1 through 1016-S) at time=N before a partition (e.g., partition 1) is subpartitioned. FIG. 13B is a block diagram illustrating a plurality of reduce processes (1016-1 through 1016-S) at time=N+1 after a partition (e.g., partition 1) is subpartitioned (e.g., into subpartition 1.1 and subpartition 1.2).

In some embodiments reduce processes (e.g., 1016 in FIG. 13A) receive multiple distinct partitions of the intermediate data. In some embodiments the reduce processes processing the multiple partitions one at a time, in succession. In some embodiments the master process periodically checks 1302 the speed of each of the reduce processes.

In some embodiments the master process identifies a first reduce process (e.g., reduce process 1 1016-1 in FIG. 13A) that is delaying the data processing job. In response to determining 1304 that one of the reduce processes (e.g., reduce process 1 1016-1) is slow, dividing the intermediate data in a partition (e.g., partition 1 1110-1) that is assigned to the first reduce process (e.g., reduce process 1 1016-1) into a plurality of subpartitions (e.g., subpartition 1.1 1110-1.1 and subpartition 1.2 1110-1.2 in FIG. 13B). The master process assigns each subpartition to a reduce process (e.g., reduce process 2 1016-2 and reduce process 1016-S in FIG. 13B) that is not the first reduce process.

In some embodiments assigning a subpartition to a reduce process includes sending instructions to the reduce process associated with the subpartition to create the subpartition by requesting 1310 a subset of the partition from the reduce process associated with the partition (e.g., partition replication from the first reduce process, but only replicating the portion of the partition associated with the sub-key). In some other embodiments assigning a subpartition to a reduce process includes sending instructions to the reduce process associated with the partition to create the subpartition by sending 1310 intermediate data associated with the sub-key to the reduce process associated with the subpartition. In some other embodiments assigning a subpartition to a reduce process includes sending instructions to the reduce process associated with the subpartition to create the subpartition by requesting 1308 intermediate data from the map processes (e.g., reshuffling data from the map processes using a sub-key that is associated with only a subset of the intermediate data in the original partition). In some other embodiments assigning a subpartition to a reduce process includes sending instructions to one or more map processes to send 1308 intermediate data associated with the sub-key to the respective reduce process associated with the new subpartition.

Identifying a reduce process that is delaying (or likely to delay) a data processing job may be in any manner commonly known in the art or one of the specific approaches discussed above with reference to FIGS. 12A-12B.

It should be understood that, as with partition replication, subpartitioning offers a performance trade-off: reshuffling the data can generate load on the cluster via disk seeks, adds network traffic and consumes computing cycles for filtering, thus subpartitioning is the most useful when the master process can predict that all of the sub-partitions to complete before the original partition. In particular, subpartitioning costs the transfer of data from data sources to reduce processes and the cost of creating the subpartitions (either by reshuffling data from the map processes or by transferring data from the slow reduce process). However, in some embodiments, this cost compares favorably with the decrease in the execution time due to the use of subpartitions. One advantage of subpartitioning over simply creating a backup process or partition replication is that the resulting subpartitions are smaller than the original partition, which makes it more likely that the subpartitions will finish faster than the original reduce process.

Additionally, it should be understood that, as the number of partitions increases, it becomes increasingly difficult to keep track of partition metadata. Adding additional partitions increases the resources (processing power and memory) that are required to manage the additional partitions. Creating subpartitions only as needed for a few of the partitions rather than starting out with smaller partitions (e.g., by subpartitioning only the largest partitions or only the partitions that are taking the longest to process) reduces the resources required to manage the large-scale data processing.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of performing a large-scale data processing job, comprising:
   executing a plurality of processes on a plurality of interconnected processors, the plurality of processes including a plurality of map processes and a plurality of reduce processes;
   in each respective map process of the plurality of map processes:
   executing a map program to retrieve a sequence of input data blocks assigned to the respective map process and to apply a map function to each input data block in the sequence to produce the intermediate data; and
   storing the intermediate data in memory; and
   in each respective reduce process of the plurality of reduce processes:
   receiving a respective partition of the intermediate data assigned to the respective reduce process; and
   applying a reduce function to the respective partition of the intermediate data to produce output values; and
   in a first respective reduce process:
   receiving multiple distinct partitions of the intermediate data; and
   processing the multiple partitions one at a time in succession; and
   identifying the first respective reduce process as a reduce process that is delaying the data processing job while continuing to process intermediate data and, in response, dividing the intermediate data in a partition that is assigned to the first respective reduce process into a plurality of subpartitions and assigning at least one subpartition of the plurality of subpartitions to a reduce process that is not the first respective reduce process.

2. The method of claim 1, further comprising partitioning the intermediate data into a plurality of partitions of the intermediate data, the plurality of partitions including the multiple distinct partitions of the intermediate data received by the first respective reduce process.

3. The method of claim 2, wherein the data processing job is initiated by a user, and the intermediate data is sorted into the plurality of partitions based on a partition function selected by the user.

4. The method of claim 3, wherein the partition function is defined by the user.

5. The method of claim 1, wherein the data processing job is initiated by a user, and the map function and the reduce function are selected by the user.

6. The method of claim 5, wherein the map function and the reduce function are defined by the user.

7. The method of claim 1, wherein:
   producing the intermediate data includes producing a plurality of blocks of intermediate data, wherein each block of intermediate data includes all of the intermediate data produced by applying the map function to a respective input data block; and
   receiving a respective partition of the intermediate data includes receiving a subset of the intermediate data in a first block of intermediate data that is associated with the respective partition while a second block of intermediate data is being produced, the second block of intermediate data including at least some intermediate data that is associated with the respective partition.

8. The method of claim 1, further comprising identifying a partition of the intermediate data that is likely to delay the data processing job using predefined criteria and performing a remedial action with respect to the identified partition of the intermediate data.

9. The method of claim 8, wherein identifying a partition of the intermediate data that is likely to delay the data processing job includes determining the size of the partition of the intermediate data relative to the size of other partitions of the intermediate data in the data processing job.

10. The method of claim 8, wherein remedial action comprises scheduling the partition of the intermediate data for processing on a high capacity reduce process.

11. The method of claim 1, wherein applying a reduce function to the respective partition of the intermediate data to produce output values includes:
while continuing to receive a respective partition of the intermediate data:
storing at least a subset of the intermediate data of the respective partition in memory associated with the respective reduce process;
while the intermediate data is stored in the memory associated with the respective reduce process, applying a combiner function to produce combined intermediate data values; and
applying the reduce function to the combined intermediate data values to produce output values.

12. The method of claim 11, wherein the combiner function is the same function as the reduce function.

13. The method of claim 1, wherein receiving the respective partition of the intermediate data occurs while the map processes that produced the received intermediate data continue to process input data blocks.

14. A system for large-scale processing of data, comprising:
memory;
one or more processors; and
one or more modules stored in the memory and executed by the one or more processors, the one or more modules including instructions to:
execute a plurality of processes on a plurality of interconnected processors, the plurality of processes including a plurality of map processes and a plurality of reduce processes;
in each respective map process of the plurality of map processes:
execute a map program to retrieve a sequence of input data blocks assigned to the respective map process and to apply a map function to each input data block in the sequence to produce intermediate data; and
store the intermediate data in memory; and
in each respective reduce process of the plurality of reduce processes:
receive a respective partition of the intermediate data assigned to the respective reduce process; and
apply a reduce function to the respective partition of the intermediate data to produce output values; and
in a first respective reduce process:
receive multiple distinct partitions of the intermediate data; and
process the multiple partitions one at a time in succession; and
identify the first respective reduce process as a reduce process that is delaying the data processing job while continuing to process intermediate data and, in response, divide the intermediate data in a partition that is assigned to the first respective reduce process into a plurality of subpartitions and assign at least one subpartition of the plurality of subpartitions to a reduce process that is not the first respective reduce process.

15. The system of claim 14, wherein the one or more modules further include instructions to identify a partition of the intermediate data that is likely to delay the data processing job using predefined criteria and to perform a remedial action with respect to the identified partition of the intermediate data.

16. The system of claim 14, wherein:
the instructions to produce the intermediate data include instructions to produce a plurality of blocks of intermediate data, wherein each block of intermediate data includes all of the intermediate data produced by applying the map function to a respective input data block; and
the instructions to receive a respective partition of the intermediate data include instructions to receive a subset of the intermediate data in a first block of intermediate data that is associated with the respective partition while a second block of intermediate data is being produced, the second block of intermediate data including at least some intermediate data that is associated with the respective partition.

17. The system of claim 14, wherein the instructions to apply a reduce function to the respective partition of the intermediate data to produce output values include instructions to:
while continuing to receive a respective partition of the intermediate data:
store at least a subset of the intermediate data of the respective partition in memory associated with the respective reduce process;
while the intermediate data is stored in the memory associated with the respective reduce process, apply a combiner function to produce combined intermediate data values; and
apply the reduce function to the combined intermediate data values to produce output values.

18. The system of claim 14, wherein receiving the respective partition of the intermediate data occurs while the map processes that produced the received intermediate data continue to process input data blocks.

19. A non-transitory computer readable storage medium storing one or more programs for execution by one or more processors of a computer system, the one or more programs comprising instructions to:
execute a plurality of processes on a plurality of interconnected processors, the plurality of processes including a plurality of map processes and a plurality of reduce processes;
in each respective map process of the plurality of map processes:
execute a map program to retrieve a sequence of input data blocks assigned to the respective map process and to apply a map function to each input data block in the sequence to produce intermediate data; and
store the intermediate data in memory; and
in each respective reduce process of the plurality of reduce processes:
receive a respective partition of the intermediate data assigned to the respective reduce process; and
apply a reduce function to the respective partition of the intermediate data to produce output values; and
in a first respective reduce process:
receive multiple distinct partitions of the intermediate data; and
process the multiple partitions one at a time in succession; and
identify the first respective reduce process as a reduce process that is delaying the data processing job while continuing to process intermediate data and, in response, divide the intermediate data in a partition that is assigned to the first respective reduce process into a plurality of subpartitions and assign at least one subpartition of the plurality of subpartitions to a reduce process that is not the first respective reduce process.

20. The non-transitory computer readable storage medium of claim 19, wherein the one or more programs further include instructions to identify a partition of the intermediate data that is likely to delay the data processing job using predefined criteria and to perform a remedial action with respect to the identified partition of the intermediate data.

* * * * *